(12) United States Patent
Yeo et al.

(10) Patent No.: US 7,278,775 B2
(45) Date of Patent: Oct. 9, 2007

(54) ENHANCED LCD BACKLIGHT

(75) Inventors: Terence E. Yeo, Boston, MA (US); Zane A. Coleman, Chicago, IL (US)

(73) Assignee: Fusion Optix Inc., Cambridge, MA (US)

( * ) Notice: Subject to any disclaimer, the term of this patent is extended or adjusted under 35 U.S.C. 154(b) by 0 days.

(21) Appl. No.: 11/223,660

(22) Filed: Sep. 9, 2005

(65) Prior Publication Data

US 2006/0056166 A1    Mar. 16, 2006

Related U.S. Application Data

(60) Provisional application No. 60/608,233, filed on Sep. 9, 2004.

(51) Int. Cl.
*F21V 7/04* (2006.01)
(52) U.S. Cl. ............... 362/627; 362/615; 362/623; 362/19
(58) Field of Classification Search ........ 362/615, 362/627, 629, 623, 19
See application file for complete search history.

(56) References Cited

U.S. PATENT DOCUMENTS

| | | | | |
|---|---|---|---|---|
| 3,984,176 A * | 10/1976 | Hirai et al. | ...... | 349/65 |
| 5,932,342 A * | 8/1999 | Zeira et al. | ...... | 428/327 |
| 6,268,961 B1 * | 7/2001 | Nevitt et al. | ...... | 359/488 |
| 6,517,914 B1 * | 2/2003 | Hiraishi | ...... | 428/1.1 |
| 6,712,481 B2 * | 3/2004 | Parker et al. | ...... | 362/619 |
| 6,818,263 B2 * | 11/2004 | Shimodaira et al. | ...... | 428/1.6 |
| 6,829,071 B2 * | 12/2004 | Allen et al. | ...... | 359/247 |
| 6,992,827 B2 * | 1/2006 | Sakai et al. | ...... | 359/599 |

FOREIGN PATENT DOCUMENTS

WO    WO 03/046648 A1    6/2003

OTHER PUBLICATIONS

Nitto Denko Press Release, Nov. 11, 2003, 2 pages, http://www.nitto.com/company/release/03_11_11/index.html.
Okumura et al. *J. Opt. A: Pure Appl. Opt.*, 5:S269-S275 (2003).
Patent Abstracts of Japan for JP 2001 159704, vol. 2000, No. 23 (2001).
International Search Report for PCT/US2005/031795, mailed Jan. 19, 2006.

* cited by examiner

*Primary Examiner*—Sandra O'Shea
*Assistant Examiner*—Zahra I. Bennett

(57) ABSTRACT

A light guide containing substantially aligned non-spherical particles provides more efficient control of light scattering. One or more regions containing ellipsoidal particles may be used and the particle sizes may vary between 2 and 100 microns in the smaller dimension. The light scattering regions may be substantially orthogonal in their axis of alignment. Alternatively, one or more asymmetrically scattering films can be used in combination with a backlight light guide and a reflector to produce an efficient backlight system. The light guides may be manufactured by embossing, stamping, or compression molding a light guide in a suitable light guide material containing asymmetric particles substantially aligned in one direction. The light scattering light guide or non-scattering light guide may be used with one or more light sources, collimating films or symmetric or asymmetric scattering films.

25 Claims, 12 Drawing Sheets

ENHANCED LCD BACKLIGHT

RELATED APPLICATIONS

This application claims the benefit of priority under 35 U.S.C. 119(e) to copending U.S. Provisional Application Nos. 60/608,233, filed on Sep. 9, 2004, the entire contents of which is incorporated herein by reference. Related applications are Ser. Nos. 11/197,246 and 11/200,592, the entire contents of which are incorporated herein by reference.

FIELD OF THE INVENTION

The invention generally relates to an enhanced backlight and method of manufacture and more specifically its use as an LCD backlight.

BACKGROUND OF THE INVENTION

Conventional LCD backlighting assemblies use a linear cold cathode fluorescent lamp (CCFL) to inject light into the edge of a clear light guide. In order to extract light from the light guides in backlights, diffusing white spots are often printed on the bottom of the light guide. These spots reflectively diffuse light out of the light guide. The control over the angular spread of the reflected light from the dots is very poor; a significant amount of light is redirected back toward the lamp or other to areas where the light is absorbed. The poor control over light also directs light into wide angles and viewing zones where it is often undesired. The loss of light results in dimmer displays or lost electrical power. Minimizing electrical power drain and maximizing brightness are critical in portable and handheld devices such as laptop computers and mobile phones.

For extended color, longer lifetime, increased optical efficiency, and cost, LEDs are becoming utilized more in backlight assemblies instead of CCFLs. Since LEDs are closer to being a point source, LED light can be controlled more efficiently than the extended source CCFL. However, by using the same white spot diffusers noted above in light guides, the light is scattered in all directions, up to the critical angle of the light guide air interface. The refracted angular spread of light out of the light guide can reach angles approaching 90 degrees from the surface. Additional diffuser films used to reduce the visibility of the white dots spread this light further into undesired, i.e., wider, angles. Optical films such as prismatic films are then necessary, to "rein in" a portion of this light back toward 0 degrees (the direction perpendicular to the surface). Thus, between the white dots spreading light out into larger angles than needed, and then using collimating films to bring a portion of this light back toward the normal or desired viewing angles, a significant amount of light is lost and the process is an inefficient one.

Other backlight configurations have been proposed using symmetric scattering particles instead of white dots. Scattering light guides have been described as "highly scattering optical transmission" (HSOT) polymers by Okumura et al (*J. Opt. A: Pure Appl. Opt.* 5 (2003) S269-S275). The authors demonstrated that a backlight based upon a HSOT polymer has the potential to provide twice the brightness of a conventional backlight. However, the particles used are symmetric or spherical in shape. The Okumura teachings do not account for the asymmetric nature of the input light, or the need for more light to be diffused vertically, horizontally, or out from the main face of the light guide. Backlights that use symmetric diffusers also scatter light into undesired directions, and have poor optical control over the scattering.

SUMMARY OF THE INVENTION

The present invention provides an improved backlight assembly with inherently more flexibility for display system designers and higher optical efficiency. By using one or more asymmetrically scattering regions in combination with a light guide, more control over the scattering of light can be obtained, and the optical efficiency can be increased. Thus, light guide backlights with a reduced component count and a more efficient way of controlling angular light scattering in the x, y, and z directions is provided by the invention.

In one embodiment, a light guide contains substantially aligned asymmetric particles that preferentially scatter light along one or more axis. In another embodiment, asymmetric scattering regions are optically coupled to a substantially non-scattering light guide and a reflector. One or more of these scattering regions can contain asymmetric particles wherein the particle sizes may vary between 2 and 100 microns in the smaller dimension. The light scattering regions may be substantially orthogonal in their axis of alignment. The light guides may be manufactured by embossing, stamping, or compression molding a light guide in a suitable light guide material containing asymmetric particles substantially aligned in one direction. The light scattering light guide or non-scattering light guide may be used with one or more light sources, collimating films or symmetric or asymmetric scattering films to produce an efficient backlight that can be combined with a liquid crystal display or other transmissive display.

DETAILED DESCRIPTION OF THE INVENTION

Figure 1:
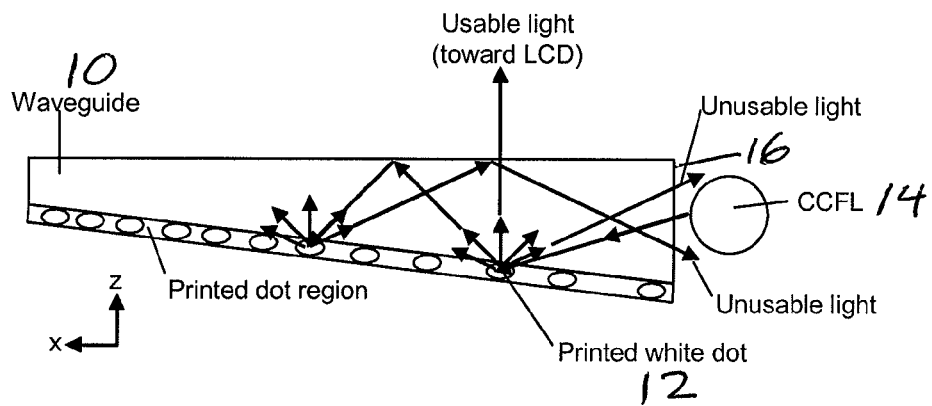
FIG. 1 is a schematic cross-sectional side view of a traditional liquid crystal display backlight.

The features and other details of the invention will now be more particularly described. It will be understood that particular embodiments described herein are shown by way of illustration and not as limitations of the invention. The principal features of this invention can be employed in various embodiments without departing from the scope of the invention.

Definitions

For convenience, certain terms used in the specification and examples are collected here.

"Speckle" includes scintillation or the optical interference pattern visible on a diffusing element.

"Speckle Contrast" is defined herein as the ratio of the standard deviation of the intensity fluctuation to the mean intensity over the area of interest.

"Diffuse" and "diffusing" as defined herein includes light scattering by reflection, refraction or diffraction from particles, surfaces, or layers or regions.

"Dispersed phase," "particles," and "micro-bodies" as used herein refer to regions of material that are distinct from the surrounding material. They are confined regions having distinct boundaries of different optical or physical characteristics without regard to specific shapes and sizes. The particle will typically scatter light if the optical properties such as refractive index is different from that of its surrounding material in at least one of the x, y, or z directions. The optical properties of the particle as described herein may be considered as independent of how it was made. For example, a dispersed phase may refer to the lower concentration of two immiscible blends that were extruded, or it may refer to glass fibers that were added to a material before extrusion to form dispersed phases (glass fibers) in a continuous phase matrix. Examples of micro-bodies include particles, particulates, dispersed phases, phases within a matrix of material, gaseous bubbles within a material, voids, spheres, microspheres, hollow microspheres, fibers, etc.

"Polarizer" as defined herein include absorbing or reflecting polarizers. These include dye and iodine based polarizers and reflective polarizers such as DBEF films from 3M. Linear or circular polarizers are also included. As used in these embodiments, it is commonly known that polarizers may be combined with waveplates or birefringent films in order to increase light recycling efficiency. For example, a quarter-wave film may be combined with a reflective polarizer to rotate the polarization state of the light such that more may pass through the polarizer.

"Optically coupled" is defined herein as a condition wherein two regions or layers are coupled such that the intensity of light passing from one region to the other is not substantial reduced by Fresnel interfacial reflection losses due to differences in refractive indices between the regions. "Optically coupling" methods include methods of coupling wherein the two regions coupled together have similar refractive indices or using an optical adhesive with a refractive index substantially near or in between the regions or layers. Examples of "Optically coupling" include lamination using an index-matched optical adhesive, coating a region or layer onto another region or layer, or hot lamination using applied pressure to join two or more layers or regions that have substantially close refractive indices. Thermal transfer is another method that can be used to optically couple two regions of material.

"Prismatic" or "Prismatic sheet" or "Prismatic structure" is defined herein as a surface relief structure that refracts light toward a desired direction. This refraction can provide collimating properties to light passing through the film. The structure can include arrays of elongated prism structures, micro-lens structures, and other surface relief structures known in the art.

"Light guide" or "waveguide" refers to a region bounded by the condition that light rays traveling at an angle that is larger than the critical angle will reflect and remain within the region. In a light guide, the light will reflect or TIR (totally internally reflect) if it the angle (α) does not satisfy the condition $$\alpha < \sin^{-1}\left(\frac{n_2}{n_1}\right)$$

where $n_1$ is the refractive index of the medium inside the light guide and $n_2$ is the refractive index of the medium outside the light guide. Typically, $n_2$ is air with a refractive index of n≈1, however, high and low refractive index materials can be used to achieve light guide regions. The light guide may comprise reflective components such as reflective films, aluminized coatings, surface relief features, and other components that can re-direct or reflect light. The light guide may also contain non-scattering regions. Light can be incident on a light guide region from the sides or below and surface relief features or light scattering particles, phases or elements within the region can direct light into larger angles such that it totally internally reflects, or into smaller angles such that the light escapes the light guide. The light guide does not need to be optically coupled to all of its components to be considered as a light guide. A region can be functional as a waveguide for the purposes illustrated herein, as long as the thickness is larger than the wavelength of light of interest. For example, a light guide may be a 5 micron region with 2 micron×3 micron ellipsoidal dispersed particles, or it may be a 3 millimeter diffuser plate with 2.5 micron×70 micron dispersed phase particles.

The "gain" of a light scattering element is the ratio of the maximum luminance of an illuminated light transmitting material in a given direction relative to the luminance of a theoretically perfect diffuser in the same direction. To measure the gain of a particular sheet of material, a known amount of light is directed to the sheet, and the maximum luminance is measured using a standard luminance meter. The maximum luminance of light measured is then compared to a theoretically "perfect" diffusive material.

The gain for an imperfect diffuser is the value of the maximum luminance (ML) divided by the value of the luminance of the theoretically perfect diffuser. For a theoretically perfect transmissive Lambertian diffuser material, providing one foot-candle (10.76 lumen/m$^2$) of illumination to the material results in the luminance of one footlambert at all angles. Therefore, if the maximum luminance by a material from transmitted light is equal to one footlambert, its gain with respect to a theoretical diffuser is 1.0 for that angle of transmission. For imperfect diffusers the gain will be maximum (ML) and larger than 1 for a given viewing direction (typically measured orthogonal to the plane of the diffuser).

Thus, a high gain screen will typically be brighter when viewed orthogonal to the plane than at other angles. Because the light transmitted by the material can never be more than the amount of light supplied, less light must be transmitted at angles other than the angle of maximum luminance.

"Angle of view" (AOV) is a measurement of illumination for all angles relative to two perpendicular axes (i.e., x and y) in the plane of the material. The angle of view is measured by applying a "full-width at half maximum" approach, a "full-width at one-third maximum" approach, and a "full-width at one-tenth maximum approach." The AOV at full-width at half maximum ($\alpha(\frac{1}{2})$) is calculated from sum of the absolute value of the angles (measured from an orthogonal to the plane of the material) at which the measured luminance is one-half the maximum luminance measured and noted. For example, if angles of +35° and −35° were measured to have one-half of the maximum luminance in the horizontal direction, the AOV $\alpha(\frac{1}{2})$ in the horizontal direction for the screen would be 70°. The AOV at full-width at one-third maximum ($\beta(\frac{1}{3})$) and the AOV at full-width at one-tenth maximum ($\chi(\frac{1}{10})$) are calculated similarly, except that they are calculated from the angles at which the luminance is one-third and one-tenth of the maximum luminance respectively.

The "asymmetry ratio" is the horizontal AOV $\alpha(\frac{1}{2})$ divided by the vertical AOV $\alpha(\frac{1}{2})$, and thus is a measure of the degree of asymmetry between the horizontal luminance and the vertical luminance of the diffuser.

"Planarization" refers to the adding of a material to a surface relief pattern or structure to increase the flatness of the surface. This can be measured by the surface roughness. An increased flatness (lower surface roughness) can promote better adhesion and in some cases have improved optical, mechanical or physical performance.

A "spherical" or "symmetric" particle includes those substantially resembling a sphere. A spherical particle may contain surface incongruities and irregularities but has a generally circular cross-section in substantially all directions. A "spheroid" is a type of ellipsoid wherein two of the 3 axes are equal. An "asymmetric" particle is referred to here as an "ellipsoidal" particle wherein each of the three axis can be a different length. Typically, ellipsoidal particles resemble squashed or stretched spheres. "Non-spherical" particles include ellipsoidal particles and other particles defined by shapes that do resemble a sphere such as those that not have constant radii. For example, a non-spherical particle may have finger-like extensions within one plane (amoeba-like) and substantially planar in a perpendicular plane.

The present invention provides an improved light guide with inherently more flexibility for display system designers and higher optical efficiency. By using a light guide containing substantially aligned asymmetric particles, more efficient control of the light scattering can be achieved. One or more regions containing asymmetric particles may be used and the particle sizes may vary between 2 and 100 microns in the smaller dimension. The light scattering regions may be substantially orthogonal in their axis of alignment. Alternatively, one or more asymmetrically scattering films can be used in combination with a backlight light guide and a reflector to produce an efficient backlight system. The light guides may be manufactured by embossing, stamping, or compression molding a light guide in a suitable light guide material containing asymmetric particles substantially aligned in one direction. The light scattering light guide or non-scattering light guide may be used with one or more light sources, collimating films or symmetric or asymmetric scattering films to produce an efficient backlight that can be combined with a liquid crystal display or other transmissive display. By maintaining more control over the scattering, the efficiency of the recycling of light by using reflective polarizers can also be increased.

The non-spherical particles can be added to the matrix material during processing or they can be created during manufacturing. In one embodiment of this invention, particles not substantially asymmetric in shape may be stretched along an axis after coating or during or after an extruding process such that they become asymmetric in shape. Other methods for achieving a single region of non-spherical particles in a region are disclosed in U.S. Pat. No. 5,932,342, the text of which is incorporated herein by reference. By using multiple layers or multi-region methods such as co-extrusion, optical lamination, optical coupling, thermal bonding, multiple regions containing light scattering particles can be combined into a single light scattering element. The degree of stretching can control the asymmetry and thus achieve a desired level of asymmetric light scattering. The asymmetric particles may have a large variation in size depending on the desired level of asymmetry. Methods including co-extrusion, laminating, thermal bonding, etc., can be used to achieve multiple regions containing dispersed phases with improved optical performance. The dispersed phase material may blended with the continuous phase material in a compounding step, a tumbling mixer, in a solvent blending process, or within an extruder.

In one embodiment of the invention, the asymmetric particles in the light guide are obtained by reducing particles in size in the x, y or other directions by stretching a film after or during extrusion.

In one embodiment of this invention the particles have a refractive index $n_{p1}$ different from the host matrix material refractive index $n_{h1}$ defined by at least one of $|n_{mx1}-n_{px1}| \geq 0.001$, $|n_{my1}-n_{py1}| \geq 0.001$, or $|n_{mz1}-n_{pz1}| \geq 0.001$ to provide sufficient light scattering. The differential refractive index ($\Delta n_{MP}$) defined as the absolute value of the difference between the index of refraction of the matrix ($n_{M1}$) and the index of refraction of the particles ($n_{P1}$), or $|n_{M1}-n_{P1}|$, may be from about 0.005 to about 0.2, and preferably is from about 0.007 to about 0.1 in the x, y, or z directions.

When more than one type of non-spherical particles are used within a light diffusing sheet, they may have a refractive index $n_{p2}$ in the x, y, or z direction that is the same or different to that of the continuous phase or the dispersed phase refractive index.

The asymmetric features, e.g., micro-bodies, typically are all oriented with their major axes substantially in one direction in the plane of the surface of the material. Desirably, the particles are made from a material which is capable of being deformed at a processing temperature in order to create their non-spherical shape by stretching. The shape may resemble a non-spherical ellipsoid or shapes that have non-constant radii in the x, y, or z direction may also be formed. For example, the domains may appear randomly shaped in one plane (amoeba-like) and substantially planar in a perpendicular plane. Further, the volume density of the particle, the average size and shape, and the index of refraction in the x, y, and z directions may be optimized to control desired properties of the light guide.

The average dimension of a dispersed domain or particle in the x, y, or z direction in the matrix may be from about 1 μm to about 30 μm, preferably from about 2 μm to about 15 μm, and most preferably from about 2 μm to about 5 μm in the minor dimension.

The average dimension of a dispersed domain or particle in the x, y, or z direction in the matrix may be from about 2 μm to about 2 cm, preferably from about 5 μm to about 1 cm, and most preferably from about 10 μm to about 500 μm in the major dimension.

The differential refractive index ($\Delta n_{ME}$) is defined as the absolute value of the difference between the index of refraction of the matrix ($n_M$) and the index of refraction of the ellipsoidal particles ($n_E$), or $|n_M-n_E|$, may be from about 0.005 to about 0.2, and preferably is from about 0.007 to about 0.1 in the x, y, or z direction.

Suitable materials for the particles include acrylics such as polymethylacrylates; polystyrenes; polyethylenes; polypropylenes; organic acid cellulose esters such as cellulose acetate butyrates, cellulose acetates, and cellulose acetate propionates; polycarbonates; or silicones. The particles may also contain coatings of higher or lower refractive index materials, or they may be hollow materials containing a gas mixture such as air. In a preferred embodiment, polyethylene may be used.

Other suitable materials for the transmissive micro-bodies include those that are not deformed during the extrusion or manufacturing process. These include spherical or non-spherical materials that have fibrous, plate-like or other orientable shapes. These include inorganic fibrous material, glass fibers, mica, silica, cross-linked polymers, plate-like materials, fibrous polymer materials with high melting points or high glass transition temperatures The micro-bodies may be aligned during the manufacturing process, such as alignment due to stretching or extruding the region containing the dispersed micro-bodies.

The light guide may also contain a surface relief structure on one or more surfaces of the material. The asymmetric surface relief structure can be manufactured by techniques as described above, e.g., embossing. The surface relief desirably contains asymmetrically shaped features predominantly aligned in the horizontal or vertical directions such that they refract, diffract, scatter, diffuse the incident light in the horizontal or vertical directions.

The surface relief structure of the light guide may help reflect, diffract, refract, or scatter light into the light guide. Alternatively, the surface relief structure of the light guide may collimate light (bring it toward smaller angles towards the display normal for example).

By using a vertically-oriented prismatic array as the surface relief structure light can be collimated. The asymmetric microbodies should be oriented horizontally (i.e., perpendicular to the lenticules) so the scattering is substantially in the vertical direction (i.e., parallel to the lenticules). Thus, the collimated light is focused through the non-spherical particles with the light scattering only in the vertical direction.

The alignment of the asymmetric micro-bodies can also vary. By aligning the particles with respect to the prismatic structure at angles other than parallel or perpendicular, other asymmetric viewing angles can be achieved. The asymmetric micro-bodies will inevitably cause some scattering in the minor axis. This may be designed to be very small, or significant. In one embodiment, the scattering in the minor axis is chosen to be just sufficient to diffuse the specular component of the light source in the plane perpendicular to major axis of the prismatic structure.

Multiple-element diffusers in accordance with the invention are desirably optically coupled to one another, i.e., so the intensity of light passing from one region to the other is not substantially reduced due to Fresnel interfacial reflection losses due to differences in refractive indices between the regions. Optical coupling methods include joining two regions having similar refractive indices, or by using an optical adhesive with a refractive index substantially near or in between the elements or layers.

Particles that are significantly smaller than the wavelength of light may be added to alter the effective refractive index. In one embodiment, the size of the particles are less than $1/10^{th}$ the wavelength of light. In a preferred embodiment, the size of the particles are less than $1/20^{th}$ the wavelength of light of interest such that significant additional scattering (forward or backward) does not take place. These particles may be symmetric, asymmetric, or random in shape. For example, very fine particles of titanium dioxide may be added to a material to increase the effective refractive index of the material. The effective refractive index change can adjust the scattering properties of the material, refractive properties, and the interfacial reflections.

The diffusers of the invention may also include an optional hardcoat to increase the stability of the element, and/or an optional anti-reflective coating. The hardcoat may be any light-transmissive support layer, such as a siloxane-based polymer layer.

With this invention, several steps in the light guide manufacturing process and additional components can be eliminated. There is no need for any printing steps (i.e., no white dots) and a diffusion sheet that typically rests on top of the light guide to smooth out the non-uniformities caused by the white dots may not be needed.

FIG. 1 shows a prior art light guide section 10 in a backlight, where white dots 12 scatter the light in a Lambertian-like manner, thus sending a significant amount of light toward the light source 14 (i.e., back scattering). A large percentage of this light is lost (i.e., it escapes the light guide and is therefore unusable) when it reaches the edge 16 of the light guide 10 where the light was coupled in originally. As shown in FIG. 1, light reflecting off of the white dots 12 is scattered in the ±y and ±x and +z directions. This is inadequate control over the scattering, and light sent to wide angles is lost.

Figure 2:
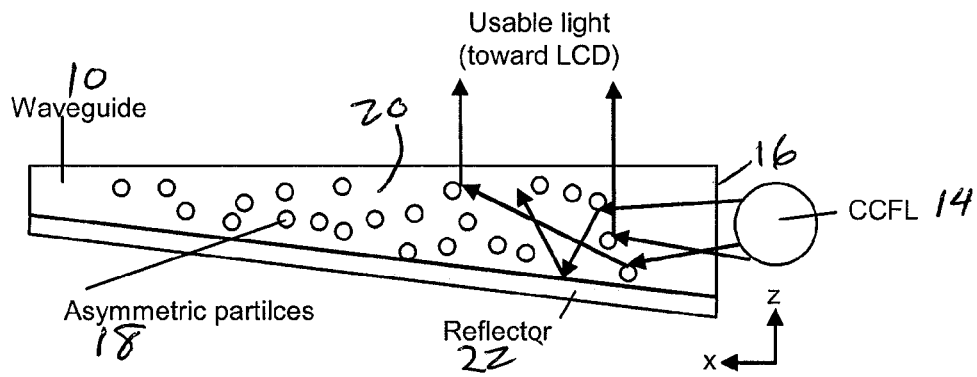
FIG. 2 is a schematic cross-sectional side view of one embodiment of an enhanced LCD backlight of the invention utilizing CCFL light sources with asymmetric particles contained within the light guide.

FIG. 2 illustrates one embodiment of an enhanced LCD backlight of this invention, wherein light from a CCFL 14 is directed into the edge 16 of a light guide 10 containing asymmetric particles 18. In this configuration, more control over the scattering is obtained by using a volumetric, asymmetric light guide. This light guide 10 will have less backscatter and more light will be coupled out of the light guide 10 in the forward direction (+z direction). The asymmetric particles 18 will preferentially scatter light in a forward direction (+x direction) and out of the light guide 10 (+z direction). The light guide 10 may be formed by casting or forming a sufficiently thick polymer material 20 containing asymmetric particles 18. A further embodiment of an enhanced backlight may include additional light diffusing films or regions and collimating sheets. Birefringent films and reflective polarizers may also be used to increase backlight efficiency.

Figure 3:
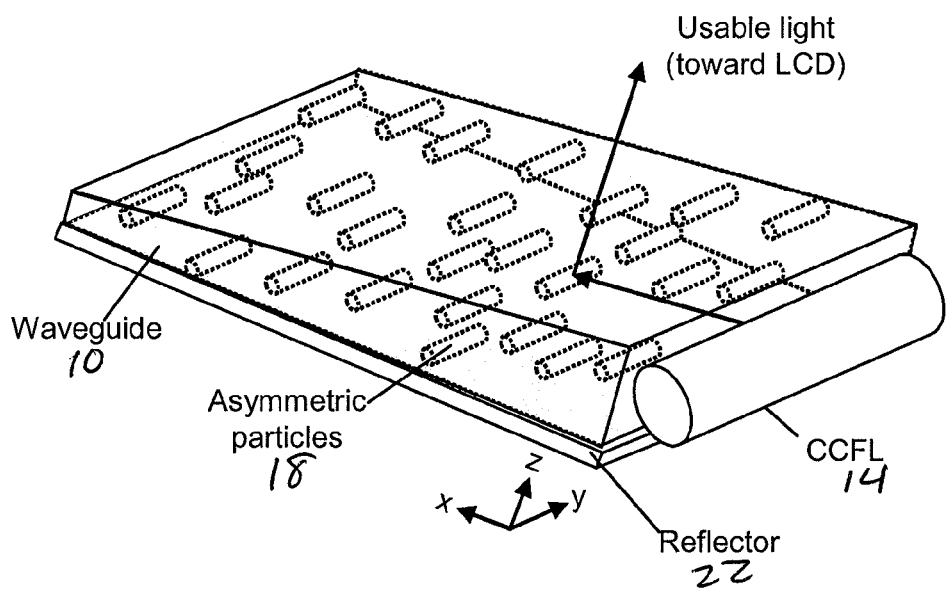
FIG. 3 is a perspective view of the embodiment of FIG. 2.

FIG. 3 illustrates a perspective view of the backlight light guide 10 shown in FIG. 2. In this embodiment, the asymmetric particles 18 in the light guide 10 predominantly scatter light from the CCFL 14 that is traveling in the +x direction into the ±z directions. The −z direction scattering will reach a reflector and be re-directed in the +z direction. When linear CCFLs 14 are used, very little scattering is needed in the y direction, because the lamp 14 is essentially a linear extended source in the y direction. Thus, an asymmetric scattering region is more efficient, because it predominantly scatters light in the ±z directions and very little, if any, in the ±y directions.

Figure 4:
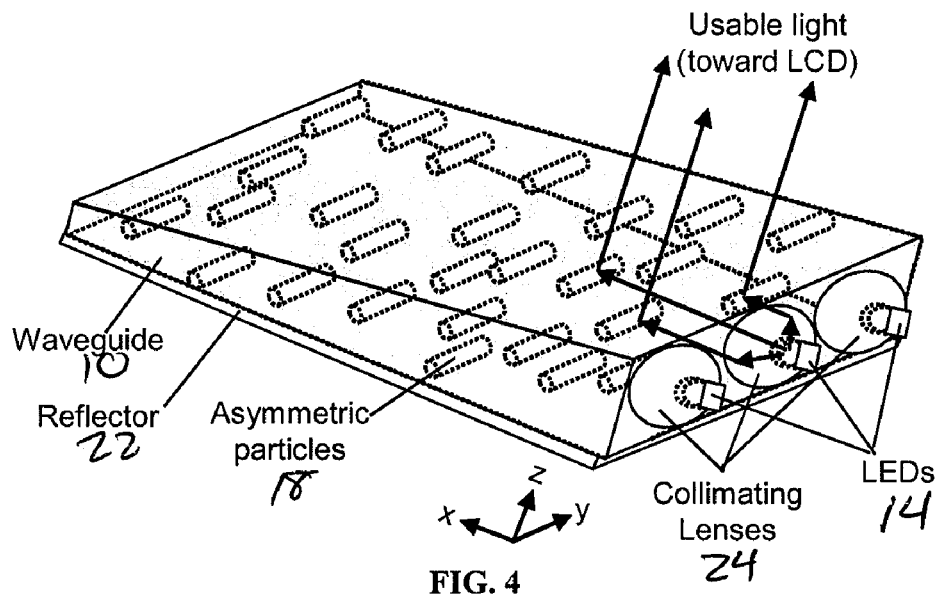
FIG. 4 is a perspective view of one embodiment of an enhanced LCD backlight of the invention utilizing LEDs with asymmetric particles contained within the light guide.

FIG. 4 illustrates an embodiment of this invention of an enhanced LCD backlight wherein LEDs 14 are used with an asymmetrically scattering light guide 10. If LEDs 14 are used to couple light in from the edge of the light guide 10 more control over the light can be achieved due to the ability to substantially collimate light from the LEDs 14 using collimating lenses 24. The directionality of the light from LEDs can be more tightly controlled, relative to the CCFLs. As a result, the angular distribution of light can be better controlled by using an asymmetric scattering region. Thus, the light from the LEDs 14 is traveling substantially only in the +x direction with very little divergence in the ±y directions. The asymmetric particles 18 are aligned such that they will diffuse the light predominantly out of the light guide 10.

Figure 5:
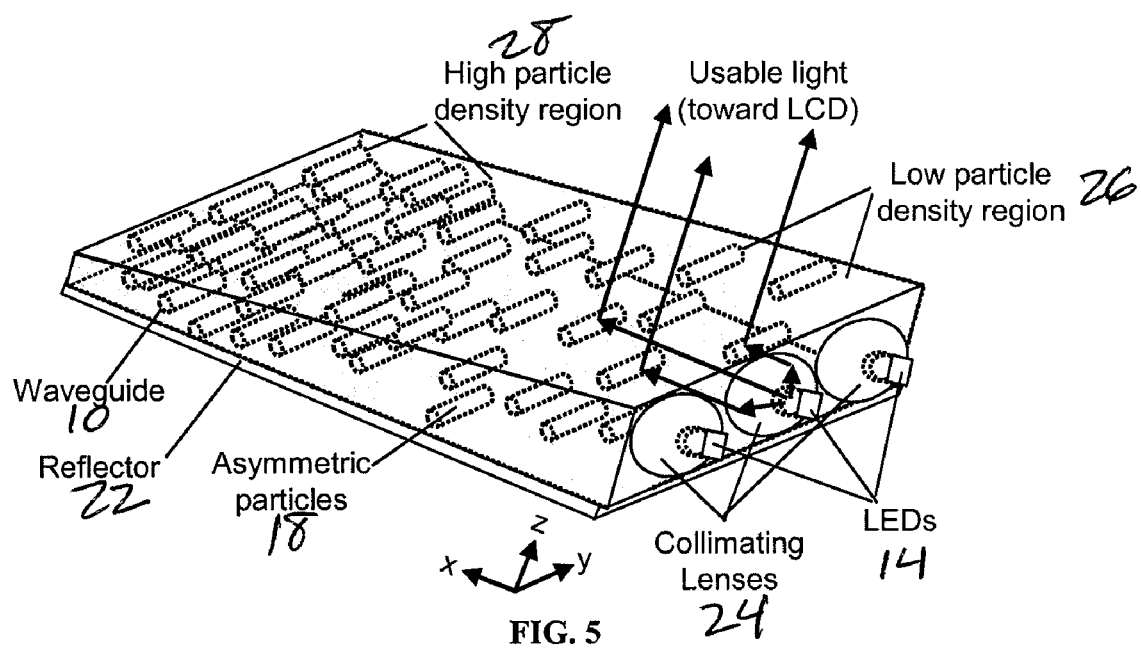
FIG. 5 is a perspective view of one embodiment of an enhanced LCD backlight of the invention utilizing LEDs with asymmetric particles of varying densities contained within the light guide.

FIG. 5 illustrates a further embodiment of this invention of an enhanced LCD backlight wherein the density of particles 18 varies throughout the length of the light guide 10. In a backlight light guide 10 containing uniform particle densities throughout the light guide 10 and a high concentration of particles 18, the light intensity uniformity can be poor. With a uniform high density of particles 18 more light is scattered out of the light guide 10 closer to the light source 14. In a printed dot light guide, the non-uniformity is controlled by the size and spacing of the white dots with typically more printed white area further from the light source. By varying the density (concentration) of asymmetric particles 18 in different regions of the light guide 10 a more uniform output can be achieved. As shown in FIG. 5, less of the light from the LEDs 14 reaches the particles 18 in the region 26 near the LEDs 14 as compared to the region 28 further from the sources 14. With different configurations of light sources 14 (more than one edge, more than one source per edge, etc.) the optimum variation in particle density could change from low to high to low density regions. Other density patterns or variations are envisioned that can provide a uniform light output intensity for a specific light source arrangement. The variation in particle density may be controlled in the manufacturing process of the asymmetric light guide 10. For example, an extruder for a film can be designed to accept feeds from different mixtures containing different concentrations of particles within the same host matrix. This film or sheet could be extruded sufficiently thick to function as a light guide for a specific light source or multiple sheets or film layers could be combined. The thickness is also reduced as shown in FIG. 5 because of the wedge shape of the light guide 10. In this manner, the wedge shape helps reflect light from the surfaces or a reflector 22 such that it can escape the total internal reflection condition and be a more uniform backlight.

Figure 6:
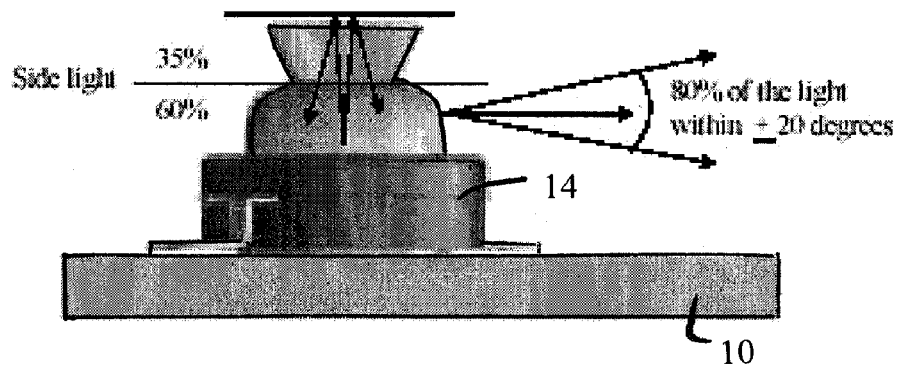
FIG. 6 is an example of a side emitting LED from LUMILEDS Inc.
Figure 7:
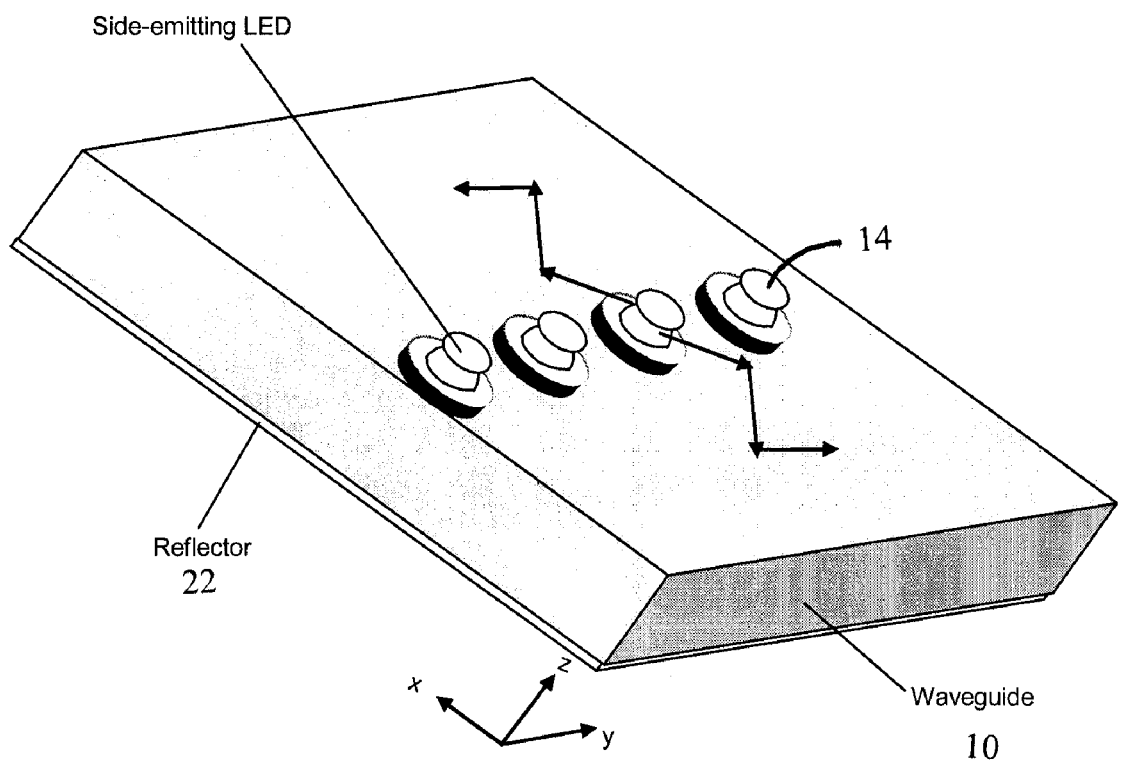
FIG. 7 is a perspective view of an LCD backlight utilizing side-emitting LEDs (Prior Art)

LED based backlights can also use the side emitting LEDs 14 such as those manufactured by LUMILEDS (FIG. 6). These side emitting LEDs 14 can be used in the central portion of a light guide such that the LEDs 14 are in a row and the light output totally internally reflects in the light guide 10 from the center line outwards as shown in FIG. 7 (Prior Art). As shown in FIG. 7, the light from the LEDs 14 enters through the hole in the light guide 10 and is totally internally reflected within the light guide 10. If one were to use printed white dots or an HSOT light guide 10, the light would scatter into undesirable angles and the system would be less efficient. The line configuration of the LEDs 14 provides light along the ±y directions. A symmetric diffuser placed on top of the light guide 10 of FIG. 4 or an HSOT would scatter light unnecessarily in the ±y directions.

Asymmetric scattering regions allow additional control of the scattered light. The scattering regions may be located within the light guide region, or alternatively, the asymmetric scattering regions may be located above or below a substantially transparent light guide region. In configurations where the scattering regions are optically coupled to the transparent light guide and the host matrix have similar refractive indices, the scattering regions may become part of the light guide. In other words, the light may scatter in the scattering regions and a portion of this light may be totally internally reflected at an air-scattering region interface.

Figure 8:
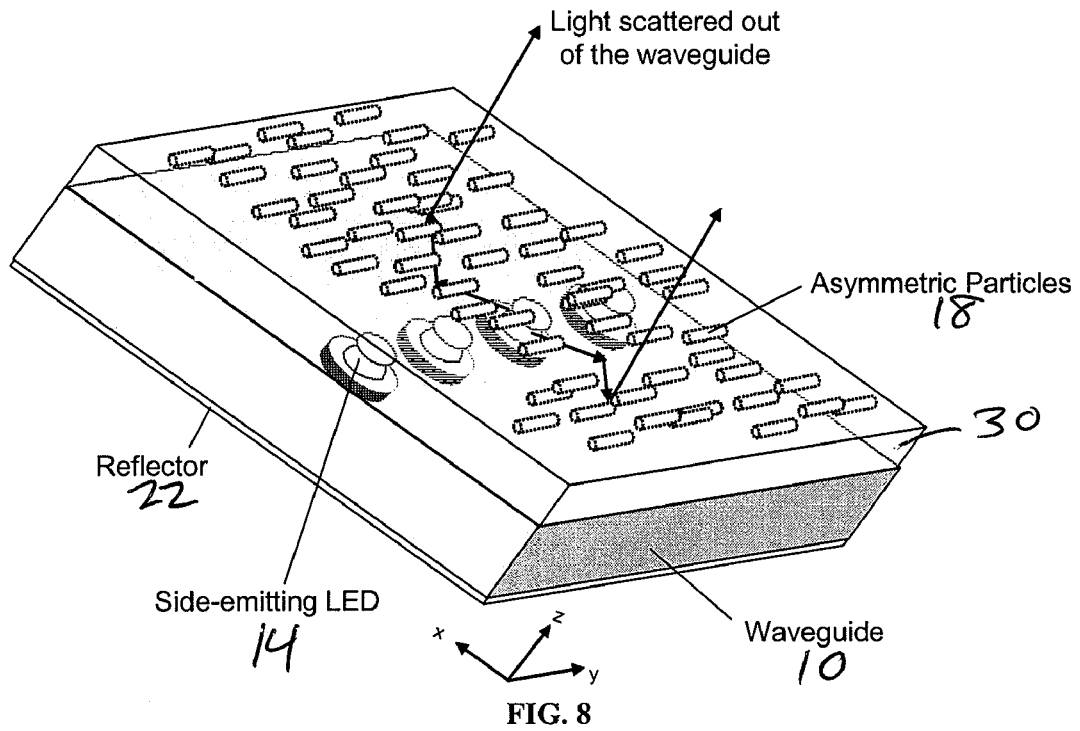
FIG. 8 is a perspective view of one embodiment of an enhanced LCD backlight of the invention utilizing side-emitting LEDs with asymmetric particles contained in a region optically coupled to the light guide.

FIG. 8 illustrates another embodiment of this invention wherein a light scattering film 30 is optically coupled to a substantially non-scattering light guide 10 with the scattering particles 18 in the film 30 arranged parallel to a line of LEDs 14 located within the planar region of the light guide 10. By aligning the particles 18 parallel to the line of LEDs 14 the light will more efficiently scatter out of the light guide 10 by scattering only in the ±z directions. The light from the LEDs 14 does not need to be substantially scattered in the ±y directions. The reflector 22 beneath the light guide 14 will re-direct light in the −z direction to the +z direction out of the light guide 10. More than one light scattering film 30 or region with the same or different alignment axis may be used to achieve a desired angular profile of light output.

Figure 9:
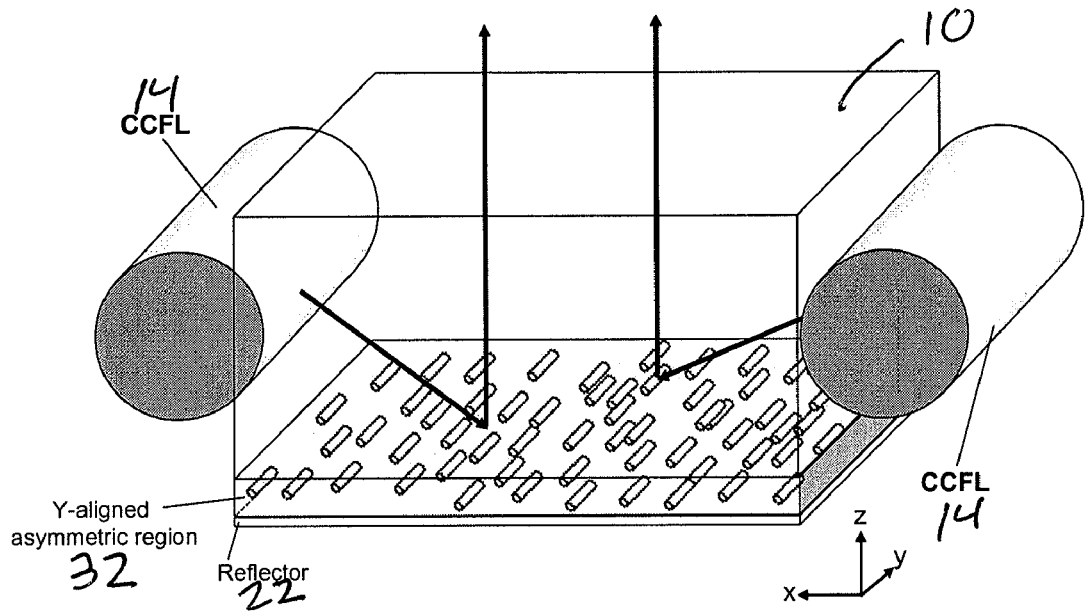
FIG. 9 is a perspective view of one embodiment of an enhanced LCD backlight of the invention utilizing two CCFLs with asymmetric particles contained in a region optically coupled to the light guide.

FIG. 9 illustrates an embodiment of this invention wherein a substantially planar asymmetric light scattering region 32 is located on the underside of a light guide 10 with a reflector 22 beneath. Light from two opposite ends of the light guide 10 enter the edge from two CCFL lamps 14. A portion of the light that reaches the asymmetric diffusive region 32 scatters in the ±z directions. There is very little scatter in the ±y directions. The light that does not scatter reaches the reflector 22 and either scatters on the way back through the region 32 or is directed through total internal reflection to another region of the scattering film. As a result, less light is scattered back towards the edges or sides and more is directed out of the light guide 10 in the +z direction.

Figure 10:
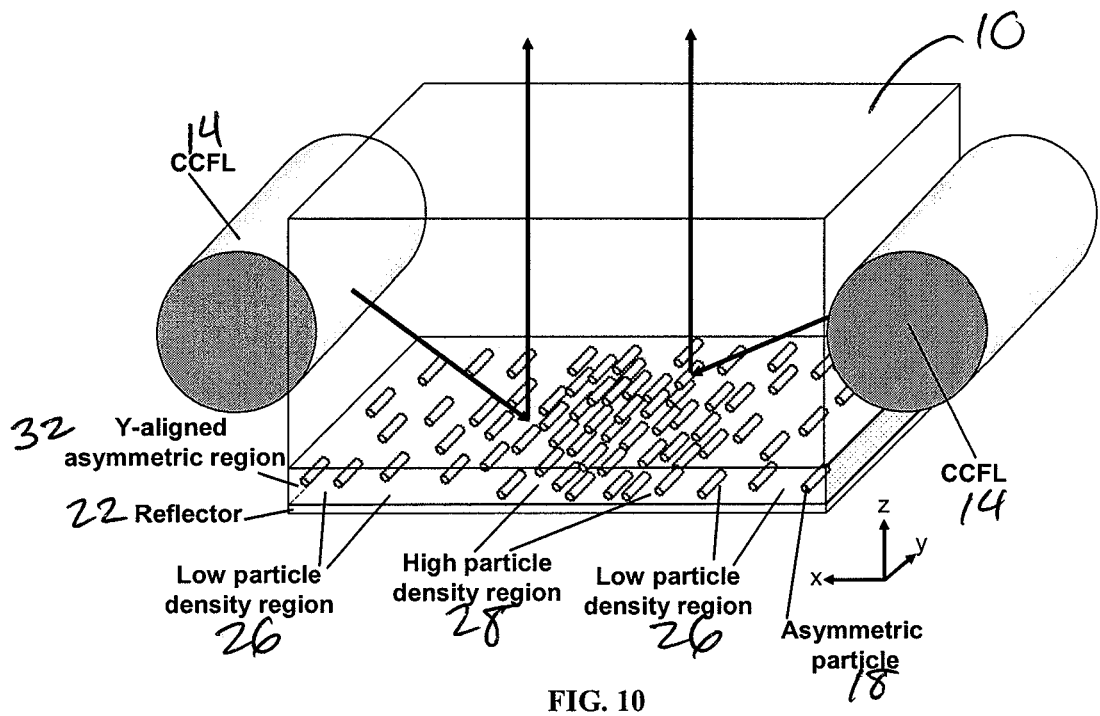
FIG. 10 is a perspective view of one embodiment of an enhanced LCD backlight of the invention utilizing two CCFLs with asymmetric particles of varying densities contained in a region optically coupled to the light guide.

FIG. 10 illustrates a further embodiment of an enhanced backlight wherein the density of asymmetric particles 18 varies related to the distance from the light sources 14. As shown in FIG. 10, the regions 26 closer to the CCFLs 14 contain a lower density of asymmetric light scattering particles 18 relative to the central portion 28. This creates a more uniform light output with the scattering effects. The light guide 10 may also be tapered and the backlight can contain additional symmetric or asymmetric diffusers, reflective polarizers, or collimating films between the light guide and the polarizer of the liquid crystal cell.

Figure 11:
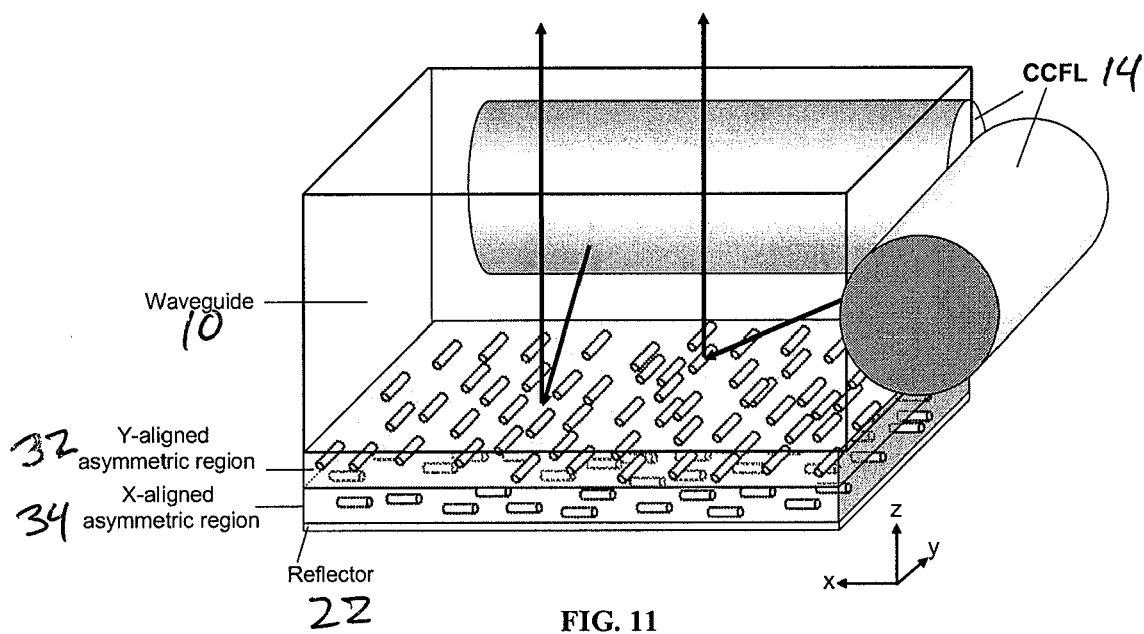
FIG. 11 is a perspective view of one embodiment of an enhanced LCD backlight of the invention utilizing two CCFLs with two regions containing asymmetric particles aligned with their axis crossed and optically coupled to the bottom of the light guide.

FIG. 11 shows another embodiment of this invention of an enhanced LCD backlight light guide 10 with two asymmetric scattering regions 32 and 34 aligned orthogonally between a reflective surface 22 and a light guide 10. The light from the CCFL 14 aligned in the y direction will reach the y-aligned asymmetric region 32 and most of the light will scatter in the ±z directions and not be scattered unnecessarily in the x direction. The light from the CCFL 14 aligned in the x direction will substantially pass through the y-aligned asymmetric region 32 and pass on to the x-aligned asymmetric region 34. This light will then be scattered predominantly in the ±z directions without having been scattered unnecessarily in the y direction. The light that is scattered in the −z direction will be reflected from the reflector 22 and re-directed out of the light guide in the +z direction. As shown in FIG. 11, the light scattering regions 32 and 34 are films located beneath the light guide 10. The density, particle asymmetry and refractive index difference, and thickness of the two orthogonal scattering regions 32 and 34 control the horizontal and vertical light scattering profile (thus viewing zones). These parameters can be adjusted individually for either layer to control the light profile. Alternatively, the light scattering regions 32 and 34 could be located in separated (spaced apart) regions to create a multi-phase scattering region that will reduce the speckle contrast of the display. Asymmetric and symmetric particles 18 may be located within the same region of the light guide 10. The axis of the asymmetric scattering regions 32 and 34 may be aligned at an angle theta with respect to each other. As shown, two CCFLs 14 are used. One, or more than two CCFLs or LEDs 14 may also be used in this configuration.

Figure 12:
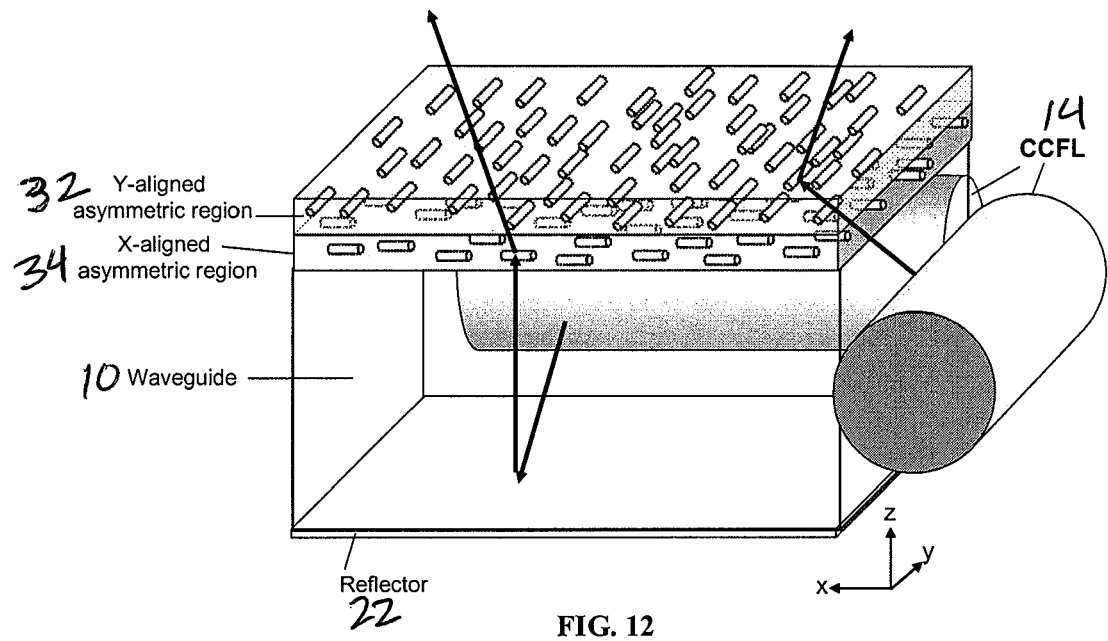
FIG. 12 is a perspective view of one embodiment of an enhanced LCD backlight of the invention utilizing two CCFLs with two regions containing asymmetric particles aligned with their axis crossed and optically coupled to the top of the light guide.

FIG. 12 shows another embodiment of an enhanced LCD backlight wherein two asymmetrically scattering regions 32 and 34 aligned at an angle with respect to each other are place between a light guide 10 and the polarizer optically coupled to a liquid crystal cell. In the drawing, the scattering axes are perpendicular to each other. The polarizer, liquid crystal cell, and other optical films are not shown for clarity. The light from the each of the CCFLs 14 scatters similar to that in FIG. 11.

Figure 13:
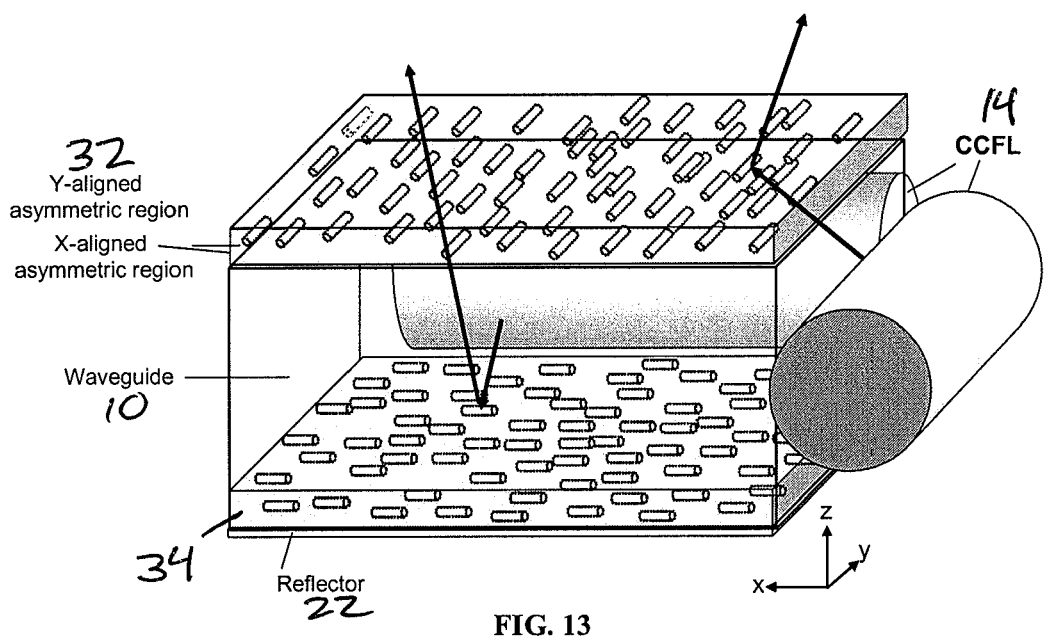
FIG. 13 is a perspective view of one embodiment of an enhanced LCD backlight of the invention utilizing two CCFLs with two regions containing asymmetric particles aligned with their axis crossed and optically coupled to the top and bottom of the light guide.

An additional embodiment of an enhanced LCD backlight is shown in FIG. 13. This configuration is similar to the one in FIG. 12 except that one of asymmetric light scattering regions 34 is located beneath the light guide 10 with the other region 32 located above the light guide 10. LLDs 14 may be used instead of CCFLs 14 in this configuration. By spacing apart the scattering regions 32 and 34 with the light guide 10, the speckle contrast can be reduced.

Figure 14:
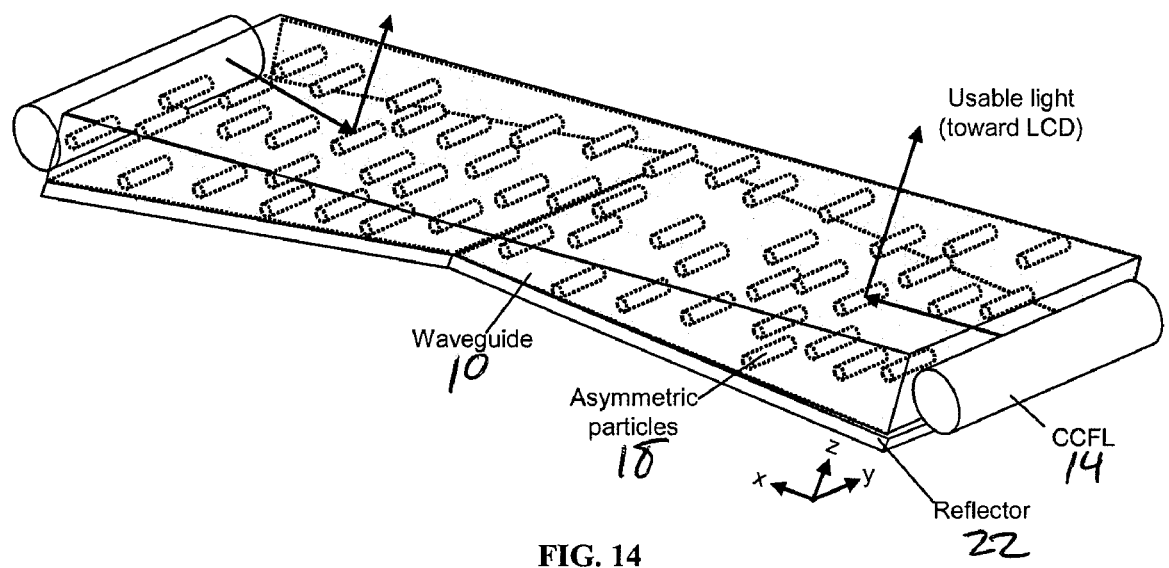
FIG. 14 is a perspective view of one embodiment of an enhanced LCD backlight of the invention with asymmetric particles contained within the tapered light guide and two CCFL light sources.

FIG. 14 shows another embodiment of this invention of an enhanced backlight light guide wherein a light guide 10 that is tapered from both ends contains asymmetric particles 18 that are substantially aligned in the y direction. The tapering causes more light to be coupled out of the light guide 10 toward the center, giving a more uniform light distribution. The tapering of the light guide 10 could also be used with LEDs 14. The tapering could also be in the y direction as well as the x direction.

Figure 15:
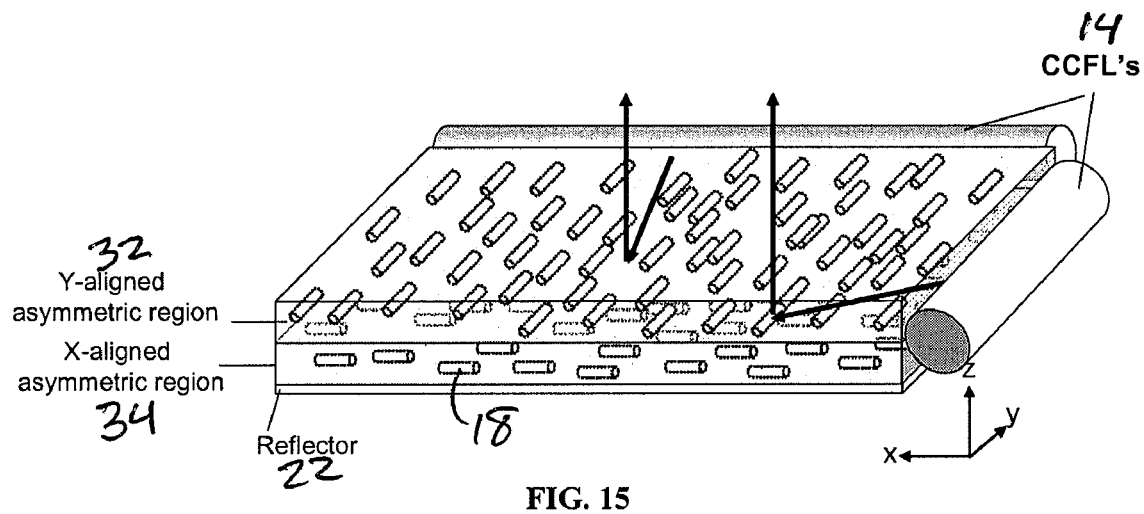
FIG. 15 is a perspective view of one embodiment of an enhanced LCD backlight of the invention utilizing two CCFLs with a light guide region composed of two regions containing asymmetric particles aligned with their axis crossed.

FIG. 15 illustrates a further embodiment of this invention wherein the light guide is composed of two asymmetric scattering regions 32 and 34. The light is scattered similar to the embodiment illustrated in FIG. 11 except that the light is totally internally reflected within one or more of the light scattering regions 32 and 34. This eliminates the need for a separate non-scattering light guide and the associated assembly process. The light scattering regions 32 and 34 could be constructed of sufficient thickness such that the light from the light sources 14 (LEDs, CCFL, etc) could be coupled into the scattering regions 32 and 34. As discussed in the embodiment of FIG. 11, by using two orthogonal scattering regions 32 and 34, the horizontal and vertical scattering (thus viewing zones) can be easily controlled. The parameters of the scattering region(s) 32 and 34 can be controlled to create a sufficiently uniform brightness across the backlight. The orthogonal light scattering particles 18 may be combined within the same region that also functions as a light guide.

Figure 16:
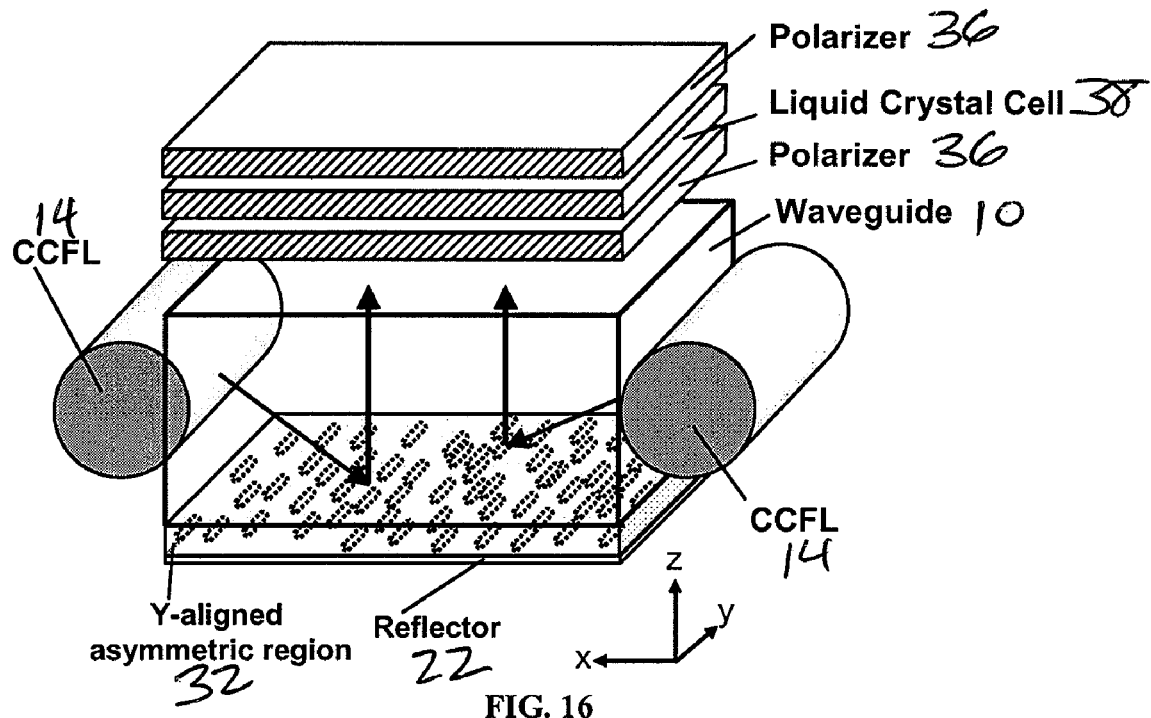
FIG. 16 is a perspective view of one embodiment of an enhanced LCD of the invention using the enhanced backlight of FIG. 9.

FIG. 16 illustrates a further embodiment of this invention of an enhanced liquid crystal display wherein the light guide 10 of FIG. 9 is combined with two polarizers 36 and liquid crystal cell 38 (which contains glass substrates, spacers, alignment regions, liquid crystal material and other materials known to those in the industry, not shown). By careful design of the parameters of the light scattering region 32 in FIG. 16, collimating films may not be needed to achieve a liquid crystal display with a desired viewing angle. For example, by using a light scattering region 32 with asymmetrically shaped particles as in FIG. 16, the light from the LCD exits substantially diffused in the ±x directions and much less in the ±y directions. This LCD would have a wide viewing angle in the horizontal direction and a small vertical viewing angle and the resulting brightness would be much higher than that of a comparable backlight with a wide horizontal and vertical viewing angle.

Figure 17:
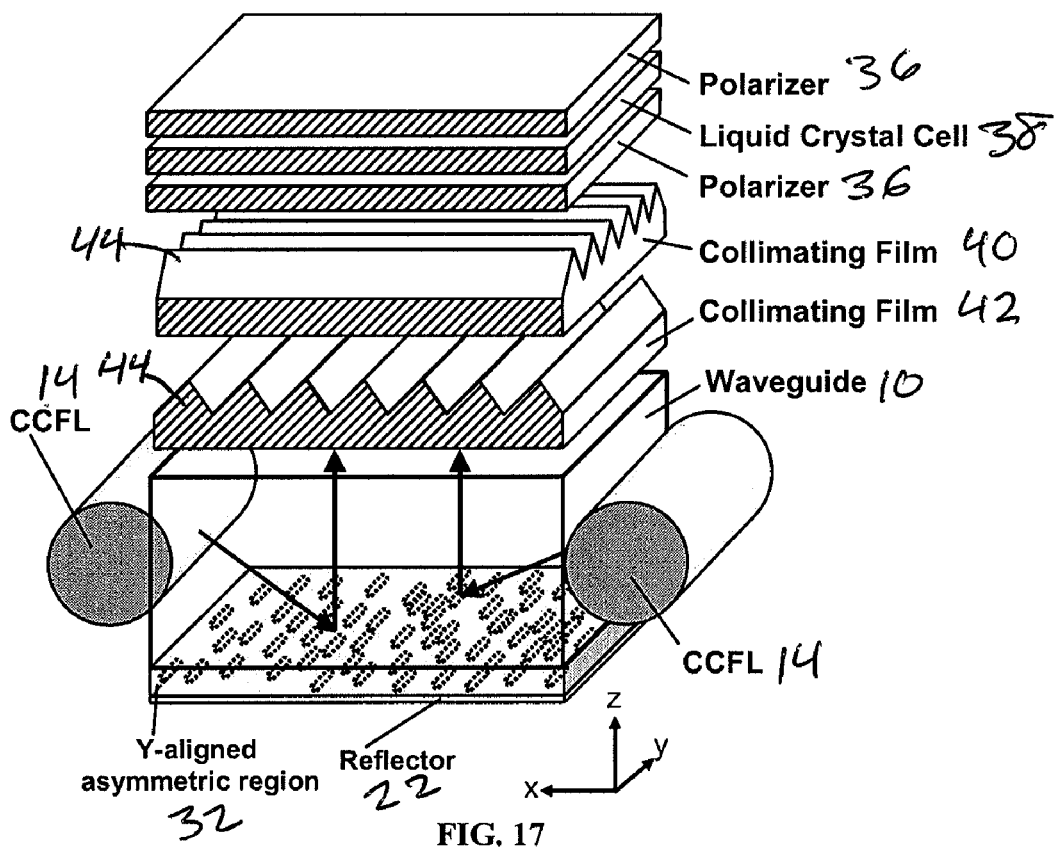
FIG. 17 is a perspective view of one embodiment of an enhanced LCD of the invention using the enhanced backlight of FIG. 9 and two crossed collimating films.

FIG. 17 illustrates a further embodiment of this invention of an enhanced LCD wherein two substantially crossed collimating films 40 and 42 such as Brightness Enhancement Film from 3M or RCF film manufactured by REFLEXITE are added to the configuration of FIG. 16. Collimating films 40 and 42 can direct at least a portion of the light from wide angles to angles closer to the normal (+z direction). This could be used to further increase the on-axis brightness of the LCD relative to that of FIG. 16. The light scattering region 32 parameters can be adjusted in conjunction with the collimating films 40 and 42 to achieve the desired angular light profile output and uniformity. The collimating films 40 and 42 may contain prismatic structures 44 with parameters that vary across the film. The height of the prismatic structures 44 can vary lengthwise along the prisms 44. By varying the height of the prisms 44, other films in contact with the sheet do not produce undesirable optical effects such as Moiré. The pitch of the prisms 44 may be non-constant. The pitch could be randomly chosen or it could be pre-determined to be a non-regular spacing. The apex angle of the prisms 44 could also vary with a regular or irregular pitch. The pitch of the prisms 44 could also vary lengthwise along the prisms. The prisms 44 could extend at an angle relative to the edge of the film. By reducing the regularity of the prismatic structure 44, optical effects such as Moiré can be reduced. Combinations of these variations on the prismatic structure 44 can be envisioned and are incorporated herein.

Figure 18:
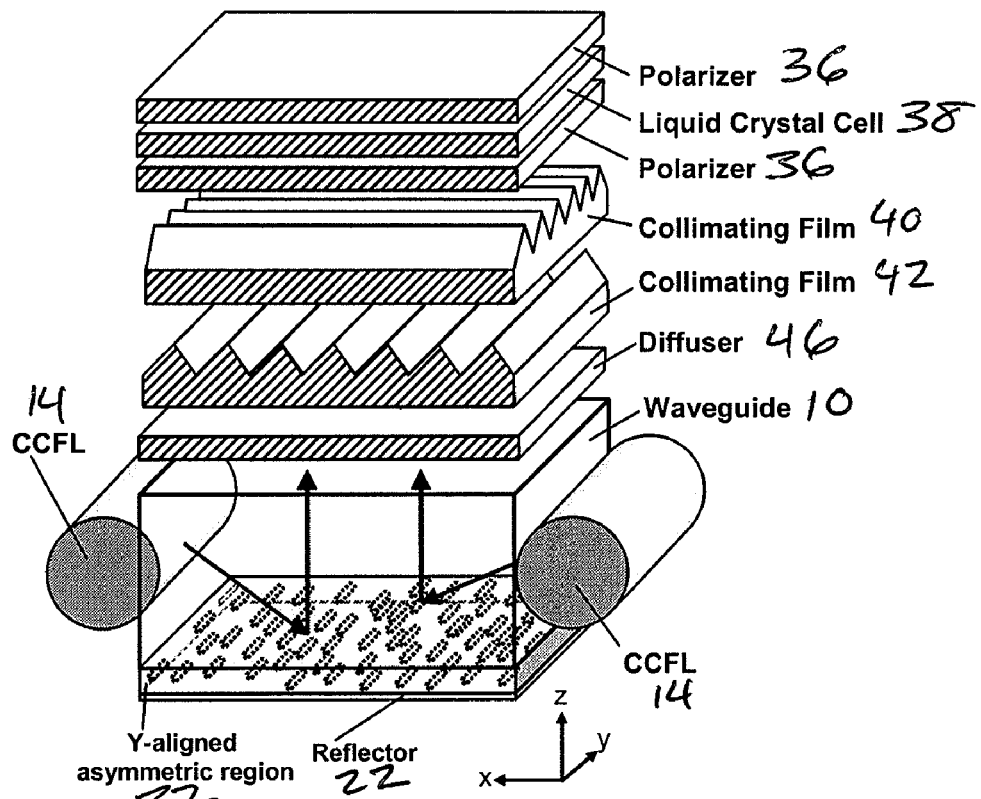
FIG. 18 is a perspective view of one embodiment of an enhanced LCD of the invention using the enhanced backlight of FIG. 9 and two crossed collimating films and an additional diffuser.

FIG. 18 illustrates a further embodiment of this invention of an enhanced LCD backlight wherein a diffuser 46 is added to the light guide configuration of FIG. 17. A symmetric or asymmetric diffuser 46 is added between the light guide 10 and the collimating films 40 and 42. The diffuser 46 can reduce the appearance of speckle from the backlight. This is more critical when LEDs are used as light sources 14 versus CCFLs. The additional diffuser 46 will also reduce the appearance of non-uniformities in the backlight intensity variations. A diffusive surface relief structure may be used beneath the collimating film structures 40 and 42 as is the case with the RCF film.

Figure 19:
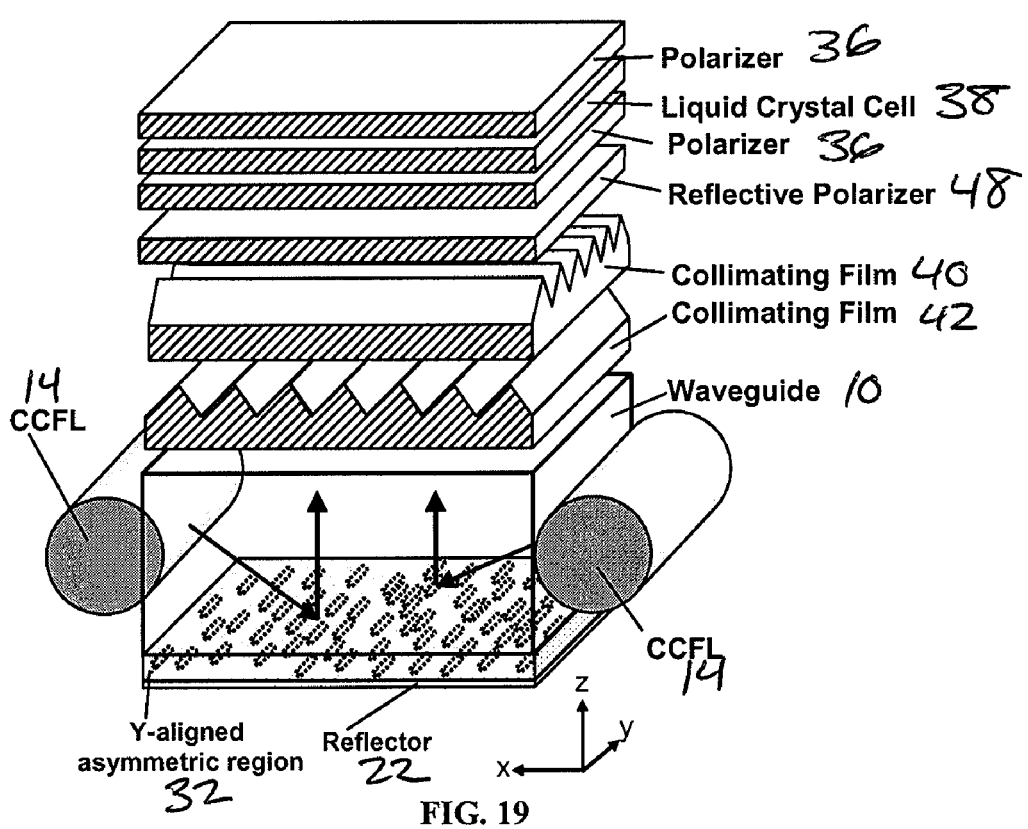
FIG. 19 is a perspective view of one embodiment of an enhanced LCD of the invention using the enhanced backlight of FIG. 9, two crossed collimating films and a reflective polarizer.

FIG. 19 illustrates a further embodiment of this invention of an enhanced LCD backlight wherein a reflective polarizer 48 is positioned above the top collimating film 40 and the liquid crystal cell 38 and polarizers 36. A reflective polarizer 48 is often used with LCD backlights to recycle the light such that more can be used. The reflective polarizer 48 is aligned to transmit light of the desired polarization (S-wave, for example) and reflect P-wave polarized light. By passing back through the diffusers after reflection and scattering the polarization of this light can be rotated such that upon reaching the reflective polarizer 48 for a second time, more can pass through. The polarization can be rotated due to stress birefringence of one or more of the optical films or light guides or the polarization can be de-polarized be the scattering off the white dots. In one embodiment of this invention, the asymmetric scattering regions 32 can be designed to have a specific birefringence such that the light is rotated efficiently such that a higher percentage of the light can pass back through the reflective polarizer 48 on the second pass. Additionally, because the control of the light scattering is more efficient with the volumetric asymmetric scattering regions 32, the recycled light also scatters more efficiently, thus more of it passes through the reflective polarizer 48 on the second or later passes and the display is brighter.

Figure 20:
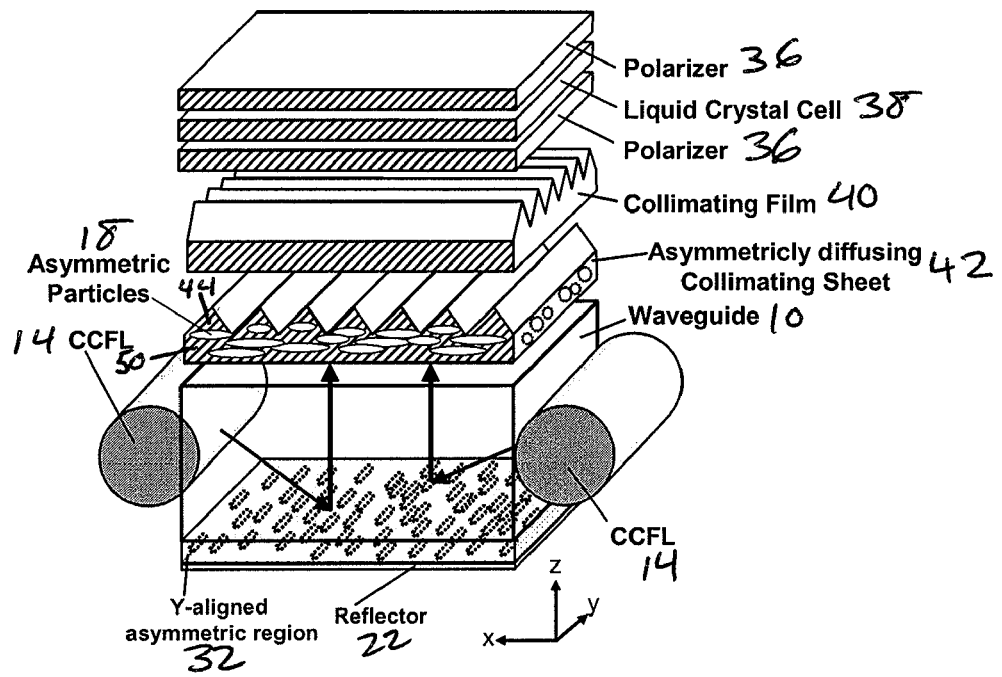
FIG. 20 is a perspective view of one embodiment of an enhanced LCD of the invention using the enhanced backlight of FIG. 9, two crossed collimating films with one of the collimating films containing asymmetric particles.

FIG. 20 illustrates a further embodiment of this invention of an enhanced LCD backlight wherein one of the asymmetric scattering regions is located within the collimating film 42. By combining the asymmetric scattering region and the collimating film into one film 42, the display thickness can be reduced and the assembly costs can be lowered. The asymmetrically scattering collimating film 42 can contain asymmetrically shaped light scattering particles 18 within the substrate 50, the prismatic structures 44, or in both regions. One or more of these regions 50 and 44 may contain substantially symmetric particles 18. The details of such asymmetric collimating films 42 are further described in U.S. Patent Application No. 60/605,956, the entire contents of which are incorporated herein by reference. The embodiments described for an enhanced light diffusing sheet can be used with the enhanced LCD backlight invention described herein.

Figure 21:
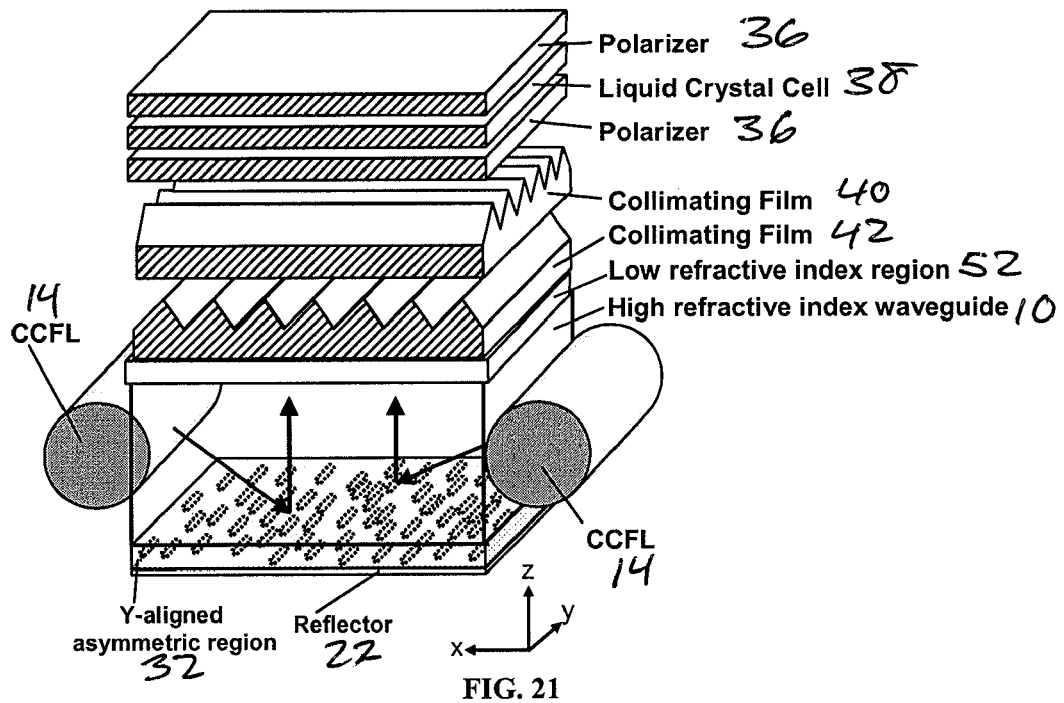
FIG. 21 is a perspective view of one embodiment of an enhanced LCD of the invention using an enhanced backlight with a high refractive index light guide and a low refractive index coating with crossed collimating films.

FIG. 21 illustrates a further embodiment of this invention of an enhanced LCD backlight wherein the light guide 10 is made using a high refractive index material. By optically coating a low refractive index region 52 on the top surface of the light guide 10, an additional film such as a collimating film 42 may be optically coupled to the surface. This can reduce the number of air gaps required and simplify the assembly process. The high and low refractive index materials can still enable a light guide that will allow the light to reflect multiple times to create uniformity across the backlight. The low refractive index material could be an aerogel, sol-gel or plastic with microscopic pores. It may also be an adhesive such that it can also function to adhere a film such as the collimating film 42 to the light guide 10. The high refractive index material could be commonly known high refractive index polymers or other material such as Nitto Denko's high-refractive index thermosetting polymer capable of reaching a refractive index of 1.76 (See Nitto Deniko Press Release, 11 Nov. 2003, at http://www.nitto.com/company/release/03_11_11/index.html). Additional diffusers, collimating films 40, and polarizers 36 may be used to produce the desired light output. CCFLs or LEDs 14 may be used in conjunction with the high refractive index light guide 10. In another embodiment, a low refractive index planarization layer is used above the collimating film 42 so that an additional collimating film 40 may be optically coupled to the first collimating film 42 and retain its light collimating characteristics. In a further embodiment, this second collimating film 40 could have a planarization layer, thus allowing other films such as a reflective polarizer to be optically coupled to it, further reducing system thickness and difficulties associated with required air gaps.

Figure 22:
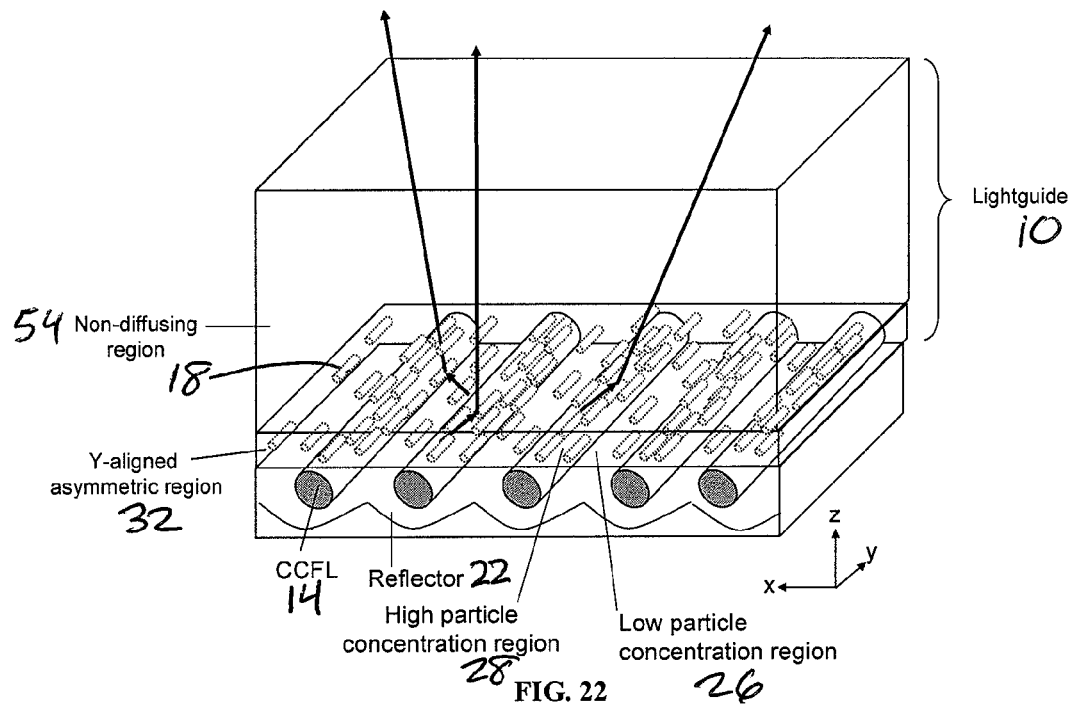
FIG. 22 is a perspective view of one embodiment of an enhanced backlight of the invention with a light guide positioned above cold cathode fluorescent lamps with varying concentration of dispersed phase particles.

FIG. 22 illustrates an embodiment of this invention wherein a light guide 10 containing a higher concentration of dispersed particles 18 directly above fluorescent lamps 14 in a backlight can improve the luminance uniformity of the backlight. In the direct-lit backlight illustrated, the illuminance on the light scattering region 32 of the light guide 10 directly above the lamps 14 is higher because it is closer to the light sources 14 and occupies a larger angular extent of the radiance in that region 32. With a traditionally symmetric diffuser or light guide plate, the luminance from the light guide 10 would be higher in the regions near the light sources 14. With an asymmetric diffusing region 32, the luminance uniformity across the light guide 10 would still be improved, although it is unlikely to be sufficiently uniform for a thin diffuser. The light scattering region 32 of FIG. 22 contains regions with higher concentration of asymmetric particles 18 in the regions closer to the light source. Thus, the regions with the high illuminance spread the light into larger angles (in the x-z plane). In the regions corresponding to locations further from a light source 14, the concentration is reduced, allowing the light to pass through the light scattering region 32 and contribute to illuminance averaging by combining with that of another light source. By scattering the light in the higher illuminance regions into larger angles, the uniformity is improved. The uniformity can be further increased by adding a second light diffusing region within the light guide 10 or between the light guide 10 and the display. A second light diffusing region will reduce the speckle contrast of the display and increase the uniformity and display contrast. In addition to a variation in dispersed phase concentration, a reduction in thickness in regions between the light sources 14 can achieve a similar affect. In a further embodiment, both the concentration and the thickness can be reduced as illustrated in FIG. 5.

Figure 23:
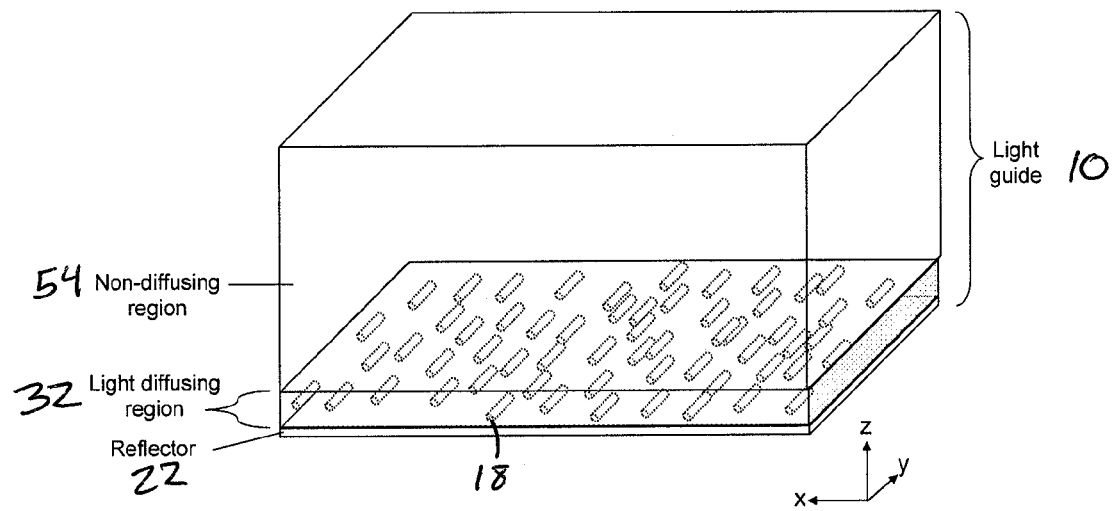
FIG. 23 is a perspective view of one embodiment of a light guide used in the enhanced backlight of FIG. 9.

FIG. 23 illustrates an embodiment of this invention wherein a light guide 10 comprises a light scattering region 32 and a non-scattering region 54. The scattering region 32 contains non-spherical dispersed phase domains 18 and can be used to create the uniform luminance backlight of FIG. 9.

Figure 24:
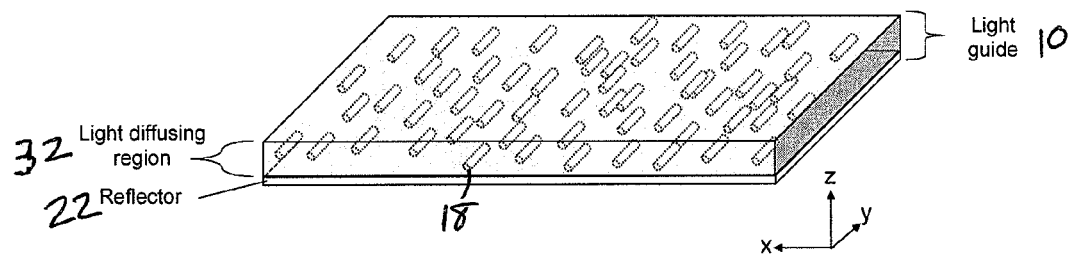
FIG. 24 is a perspective view of one embodiment of a light guide of the invention used with non-spherical particles in between the input and output surfaces of the light guide.

FIG. 24 illustrates an embodiment of this invention wherein a light guide 10 comprises a light scattering region 32 and a reflector 22 that can be used to scatter the incident light into angles that do not satisfy the total internal reflection condition at the output boundary. The scattering region 32 contains non-spherical dispersed phase domains 18.

Figure 25:
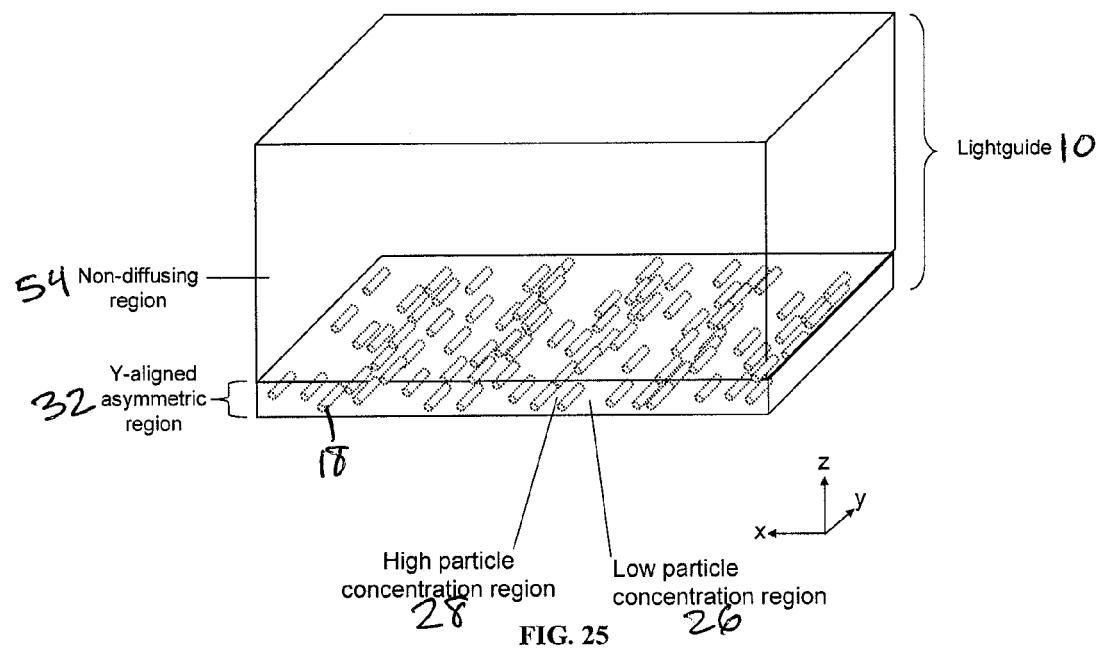
FIG. 25 is a perspective view of one embodiment of a light guide used in the enhanced backlight of FIG. 22.

FIG. 25 illustrates an embodiment of this invention wherein a light guide 10 comprises a light scattering region 32 and a non-scattering region 54. The scattering region 32 contains non-spherical dispersed phase domains 18 with a spatially varying concentration and can be used to create the uniform luminance backlight of FIG. 22.

There are a number of different mechanisms for producing asymmetric diffusion profiles in the volume of the light guide. These include creating asymmetric region by aligning particles through stretching a material or stretching a material to cause particles to become asymmetric in shape.

Additional diffusive layers or regions may be added to the top of the light guide or bottom of the light guide. The asymmetric scattering regions described herein may be located at the top or bottom of the light guide and may be aligned at an angle with respect to an edge. The reflective films may be reflective polarizers. Light from LEDs may be directed into one or more of the edges or surfaces of a light guide. Forward directing LEDs may be used behind an LCD panel wherein the asymmetric diffuse layers or regions will smooth out the intensity "hot-spots" where needed. For example, if three lines of forward directing LEDs are located behind an LCD, an asymmetric diffuser which will diffuse the light more in a direction perpendicular to the direction of the lines will more efficiently create a uniform intensity distribution and result in higher forward light output.

White LEDs or LEDs of multiple colors such as red, green, and blue may be used.

The size, shape, concentration, and orientation of the asymmetric particles may be controlled to produce the desired intensity variation, and direction of light output.

In another embodiment a light focusing pattern is embossed into the exiting surface of the light guide. Typically this structure would be that of a saw tooth nature, or an array of prisms or lens-like features such as is known in the industry.

Other optical films may be used in combination with the asymmetric diffusing region and light guide. Such optical films as prismatic films, polarizers, reflective polarizers, waveplates etc. may be used to increase brightness, efficiency or performance of the LCD.

Tapered or un-tapered light guides may be used with a light guide that contains asymmetric particles or a substantially non-diffusing light guide with an asymmetric diffusing region on the top or bottom of the substrate. The taper may be a constant angle or it may be a curved shape to produce a desired light output profile.

As described herein, the backlight may be used with liquid crystal displays. It can also be appreciated that the backlight of the invention can enhance the performance of other types of displays such as backlit signs, electrophoretic displays, LCD TV's, LCD monitors, and other active or passive transmissive displays known to those in the display industry.

The different variations in features and designs of the enhanced LCD backlight described herein can be envisioned and include one or more combinations of the features described below:

1. Light sources: CCFL; LED; OLED; electroluminescent material; laser diode; fluorescent bulb; substantially planar fluorescent bulb; halogen bulb; incandescent bulb; metal halide bulb;
2. Light source color: Red; green; blue; white; cyan; magenta; yellow;
3. Light source location: one edge of the light guide; more than one edge of a light guide; opposite side of the light guide than the liquid crystal cell; within the light guide;
4. Spacing between light scattering regions, polarizers, light guides: air gap; optically coupled.
5. Scattering region:
    a. Scattering region location: above the light guide; below the light guide; within the light guide; above collimating film(s); below collimating film(s); in between collimating films; within the prismatic structures; in the substrate of the prismatic structures; in both the prismatic structures and in the substrate; in regions of the substrate or prismatic structures wherein the regions are separated by a non-diffusing region (multi-phase).
    b. Diffusing particle shapes: Symmetric; or asymmetric particles; or a combination of both.
    c. Diffusing particles refractive index: average refractive index $n_p$ wherein $|n_p-n_m|>0.001$; refractive index $n_{px}$ and $n_{py}$, in the x and y directions respectively, wherein $|n_{px}-n_m|>0.001$; $|n_{py}-n_m|>0.001$; or $|n_{py}-n_m|>0.001$ and $|n_{px}-n_m|>0.001$.
    d. Diffusing particles density: substantially constant; varying along the y axis; varying along the x axis; varying along the z axis;
    e. Asymmetric particle alignment: substantially parallel to the prisms; substantially perpendicular to the prisms; or at an angle beta with respect to the prisms.
6. Prismatic Collimating films:
    a. Prism Pitch: Constant; non-constant (irregular); random.
    b. Prism Orientation: At an angle, phi, with respect to a predetermined edge; or at an angle phi2, wherein phi2 varies across the length of the prisms.
    c. Prism height: Constant; varying lengthwise across the length of the prisms; varying from one prism to another.
    d. Prism Apex angle: At a constant angle, alpha; or at an angle alpha2, wherein alpha2 varies across the length of the prisms; or at an angle alpha3, wherein alpha3 can vary from one prismatic structure to the next
    e. Prism structure refractive index: $n_m$, with the region in optical contact with the prism structure having a refractive index $n_1$ wherein $n_m>n_1$.
    f. Surface structure on sheet face opposite prism face: planar; prismatic; microlens array; surface relief structure providing pre-determined angular scattering (included ruled structure, holographic diffuser); any combination of the above structures.

7. Reflector type: aluminized film; aluminized light guide; multilayer film (such as 3M's ESR film); reflective polarizer; transflective; micro-voided film; white scattering paint or coating; a region containing white scattering dots.
8. Reflector location: on the opposite side of the light guide than the liquid crystal cell; between the light guide and the LCD; between the polarizers in the LCD (transflective LCD)
9. Birefringent material location: between the light guide and the reflector; within the substrate of a light scattering film; within the substrate of a collimating film; between the light guide and the liquid crystal cell;
10. Polarizer type: Reflective linear polarizer; reflective circular polarizer; absorptive linear polarizer; absorptive circular polarizer;
11. Polarizer location: viewer side of the liquid crystal cell; backlight side of the liquid crystal cell; between the light guide and a reflector; between the light guide and a collimating film; between a collimating film the absorptive polarizer optically coupled to the liquid crystal cell; between the light guide and the absorptive polarizer optically coupled to the liquid crystal cell;
12. Light guide type: symmetrically scattering; asymmetrically scattering; substantially non-scattering; tapered; at least two faces parallel; refractive index $n_d<1.52$; refractive index $n_d>1.5$
13. Light guide surface features: planar, symmetric scattering structure; asymmetric scattering structure (such as a holographically formed pattern); random scattering structure; prismatic structure; grooved structure; embossed structure; optically coupled to a low refractive index coating;

Other enhanced backlight configurations can be envisioned within the scope of this invention.

Advantageous embodiments of the present invention are illustrated in the following Examples. The following examples are given for the purpose of illustrating the invention, but not for limiting the scope or spirit of the invention.

EXAMPLE 1

An enhanced LCD backlight, in accordance with the present invention, can be produced as described in FIG. 3, that is designed to have increased optical efficiency and therefore increased brightness relative to existing backlights. This is possible because the volumetric asymmetric diffusive region within the light guide allows for better control over the light scattering. Light from two CCFL lamps is coupled into the light guide. The light guide contains light scattering particles in a host matrix material. The particle chosen may be a polystyrene bead of diameter 5 μm dispersed at concentrations up to 10% by volume in a host matrix of acrylic. Other choices of particles and host matrix may provide equivalent performance. Asymmetry and alignment of the asymmetry can be created by stretching or extrusion processes. The asymmetrically diffusing light guide can be created by extruding, casting or coating, the mixture containing the particles. The light guide may be 2.5 mm in thickness and this may be achieved by optically coupling more than one layer or region containing asymmetric particles. One or more collimating films such as 3M's Brightness Enhancement Film can be added to the top of the light guide to direct more light toward the on-axis direction. A reflective polarizer such as 3M's DBEF film can be added to increase the brightness through polarized light recycling. To further reduce speckle, scattering regions can be separated by a non-scattering region.

EXAMPLE 2

An enhanced LCD backlight, in accordance with the present invention, can be produced as described in FIG. 11, that is designed to have increased optical efficiency and therefore increased brightness relative to existing backlights. This is possible because the volumetric asymmetric diffusive region below the light guide allows for better control over the light scattering. Two crossed asymmetric light scattering regions are optically coupled to the non-scattering light guide. Light from two CCFL lamps is coupled into the light guide. The asymmetric light scattering regions contain asymmetric particles in a host matrix material. The regions may be created by creating a mixture consisting of polystyrene bead particles of diameter 5 μm dispersed at concentrations up to 10% by volume in a host matrix of acrylic. Other choices of particles and host matrix may provide equivalent performance. The asymmetrically diffusing regions can be created by extruding, casting or coating, the mixture containing the particles. These regions or films may be optically coupled to the light guide film in a crossed configuration. Light scattering regions with different scattering properties may be used to give an asymmetric angle of view when coupled to an LCD. One or more collimating films such as 3M's Brightness Enhancement Film can be added to the top of the light guide to direct more light toward the on-axis direction. A reflective polarizer such as 3M's DBEF film can be added to increase the brightness through polarized light recycling. To further reduce speckle, the scattering regions can be separated by a non-scattering region.

EXAMPLE 3

An enhanced LCD backlight, in accordance with the present invention, can be produced as described in FIG. 8, that is designed to have increased optical efficiency and therefore increased brightness relative to existing backlights. This is possible because the volumetric asymmetric diffusive region within the light guide allows for better control over the light scattering. Light from more than one side-emitting RGB LEDs coupled into the light guide through holes in the light guide. The light guide contains asymmetric light scattering particles aligned parallel to the line of LEDs. The asymmetric light scattering light guide contain asymmetric particles in a host matrix material. The regions may be created by creating a mixture consisting of polystyrene bead particles of diameter 5 μm dispersed at concentrations up to 10% by volume in a host matrix of acrylic. Other choices of particles and host matrix may provide equivalent performance. The asymmetrically diffusing light guide can be created by extruding, casting or coating, the mixture containing the particles. The concentration of the light scattering particles can be chosen to provide the optimum uniformity of light output from the light guide. A reflector is optically coupled to the underside of the light guide as illustrated in FIG. 8. One or more collimating films such as 3M's Brightness Enhancement Film can be added to the top of the light guide to direct more light toward the on-axis direction. A reflective polarizer such as 3M's DBEF film can be added to increase the brightness through polarized light recycling. To further reduce speckle, the scattering regions can be separated by a non-scattering region.

EQUIVALENTS

Those skilled in the art will recognize, or be able to ascertain using no more than routine experimentation, numerous equivalents to the specific procedures described herein. Such equivalents are considered to be within the scope of the invention. Various substitutions, alterations, and modifications may be made to the invention without departing from the spirit and scope of the invention. Other aspects, advantages, and modifications are within the scope of the invention. The contents of all references, issued patents, and published patent applications cited throughout this application are hereby incorporated by reference. The appropriate components, processes, and methods of those patents, applications and other documents may be selected for the invention and embodiments thereof.

What is claimed is:

1. A light guide comprising:
   a) at least one input surface and output surface wherein incident light exits the light guide when the total internal reflection condition is not satisfied; and
   b) a first scattering region disposed to receive light from the input surface and direct light to the output surface, comprising a continuous phase material of refractive index $n_{x1}$ and a first dispersed phase material of refractive index $n_{x2}$ wherein $|n_{x1}-n_{x2}|>0.001$ and one or more of the first dispersed phase domains are non-spherical in shape and have a domain dimension in the x, y, or z direction in the range of about 0.005 to 1 cm.

2. The light guide of claim 1, wherein the first scattering region is disposed in between the input surface and the output surface.

3. The light guide of claim 1, wherein the first dispersed phase non-spherical domains are ellipsoidal in shape with their major axes on average aligned substantially parallel or perpendicular to the light emitting source.

4. The light guide of claim 1, wherein the input surface is at an angle θ to the output surface.

5. The light guide of claim 4, wherein θ is approximately 0 degrees such that the input surface is parallel to the output surface.

6. The light guide of claim 1, further comprising a second dispersed phase material of refractive index $n_{x3}$.

7. The light guide of claim 1, wherein the light scattering region is contained within an optical film that is optically coupled to a surface of the light guide.

8. The light guide of claim 1, wherein the concentration of the dispersed phase material in the continuous phase material varies spatially.

9. The light guide of claim 1, wherein the thickness of the region containing the dispersed phase material in the continuous phase material varies spatially.

10. The light guide of claim 1, wherein the dispersed phase domains are substantially confined in at least one zone, the zone having a thickness that is less than the total thickness of the light guide.

11. The light guide of claim 1, further comprising a second light scattering region containing a second dispersed phase material of refractive index $n_{x4}$.

12. The light guide of claim 11, wherein the second dispersed phase domains are ellipsoidal in shape.

13. The light guide of claim 12, wherein the ellipsoidal domains are aligned on average substantially parallel to a second light emitting source.

14. The light guide of claim 1, wherein the first dispersed phase domains are substantially confined in at least one zone, and further comprising one or more zones containing dispersed phase domains with intervening zones substantially free of dispersed phase domains.

15. A backlight assembly comprising:
   a) a housing;
   b) a light emitting source; and
   c) the light guide of claim 1.

16. The backlight of claim 15, wherein the light emitting source is an array of light sources.

17. The backlight of claim 16, wherein the array of light sources is a substantially linear array.

18. The backlight of claim 15, wherein the light source is at least one cold cathode fluorescent lamp.

19. The backlight of claim 15, wherein the light source is at least one light emitting diode.

20. The backlight of claim 15, further comprising at least one region selected from the group consisting of hardcoat, anti-glare, anti-blocking, UV-absorbing, anti-static or anti-reflection region.

21. A display comprising a flat screen display panel and the backlight assembly of claim 15.

22. The backlight of claim 15, further comprising at least one region selected from the group consisting of light diffusing region, light collimating region, reflective region, absorptive polarizing region, or polarization dependant reflective region.

23. A liquid crystal display illuminated with the backlight of claim 22 wherein one or more of the features are disposed in the light path between the light source and the liquid crystal display.

24. The light guide of claim 1, wherein the light guide is bounded such that light rays traveling at an angle that is larger than a critical angle will reflect and remain within the light guide.

25. A backlight assembly comprising:
   a) a housing;
   b) a light emitting source;
   c) a light guide comprising:
      i. at least one input surface and output surface wherein incident light exits the light guide when the total internal reflection condition is not satisfied; and
      ii. a first scattering region disposed to receive light from the input surface and direct light to the output surface, comprising a continuous phase material of refractive index nx1 and
         a first dispersed phase material of refractive index nx2 wherein $|nx1-nx2|>0.001$ and one or more of the first dispersed phase domains are non-spherical in shape; and
   d) wherein the backlight has a speckle contrast is below 80%.

* * * * *